(12) United States Patent
Nagahama et al.

(10) Patent No.: US 9,063,287 B2
(45) Date of Patent: Jun. 23, 2015

(54) OPTICAL BODY WITH DIFFUSION REFLECTIVITY, WALL MEMBER, FITTING, AND SOLAR SHADING DEVICE

(75) Inventors: Tsutomu Nagahama, Miyagi (JP); Masayuki Tanishima, Miyagi (JP); Masashi Enomoto, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 1057 days.

(21) Appl. No.: 13/150,740

(22) Filed: Jun. 1, 2011

(65) Prior Publication Data
US 2011/0310487 A1    Dec. 22, 2011

(30) Foreign Application Priority Data
Jun. 16, 2010   (JP) ................. P2010-137785

(51) Int. Cl.
| | |
|---|---|
| G02B 5/02 | (2006.01) |
| G02B 5/26 | (2006.01) |
| E06B 9/24 | (2006.01) |
| E06B 9/28 | (2006.01) |
| E06B 9/386 | (2006.01) |
| E06B 9/40 | (2006.01) |
| G02B 5/20 | (2006.01) |

(52) U.S. Cl.
CPC ........... *G02B 5/26* (2013.01); *G02B 5/0289* (2013.01); *G02B 5/0205* (2013.01); *E06B 9/24* (2013.01); *E06B 9/28* (2013.01); *E06B 9/386* (2013.01); *E06B 9/40* (2013.01); *E06B 2009/2417* (2013.01); *G02B 5/208* (2013.01)

(58) Field of Classification Search
None
See application file for complete search history.

(56) References Cited

U.S. PATENT DOCUMENTS

| 4,040,727 | A  * | 8/1977 | Ketchpel ................. 349/114 |
| 6,898,012 | B2 * | 5/2005 | Kaminsky et al. ........ 359/599 |
| 7,655,301 | B2   | 2/2010 | Chonan et al. |
| 2003/0161997 | A1 | 8/2003 | Moran |
| 2004/0223099 | A1 | 11/2004 | Kotchick et al. |
| 2004/0233524 | A1 * | 11/2004 | Lippey et al. ............ 359/443 |

FOREIGN PATENT DOCUMENTS

| JP | SHO 63-127593 | 8/1988 |
| JP | 2005-87680 | 9/2005 |
| JP | 2006-003647 | 1/2006 |
| JP | 2006-071898 | 3/2006 |
| JP | 2007-010893 | 1/2007 |
| JP | 2007-525692 | 9/2007 |
| JP | 2009-048092 | 3/2009 |
| JP | 2009-265143 | 11/2009 |

(Continued)

OTHER PUBLICATIONS

Japanese Office Action mailed May 24, 2011, for corresponding Japanese Patent Appln. No. 2010-137785.
Intellectual Property Office of Singapore, Search Report, issued in connection with Singapore Patent Application No. 201104146-4, dated Apr. 26, 2012. (1 page).

(Continued)

*Primary Examiner* — Arnel C Lavarias
(74) *Attorney, Agent, or Firm* — Oliff PLC

(57) ABSTRACT

An optical body includes a first optical layer having a random concave-convex surface, a reflecting layer formed on the concave-convex surface, and a second optical layer formed on the reflecting layer to embed the concave-convex surface, wherein the reflecting layer is a wavelength-selective reflecting layer for diffusely reflecting, of incident light, light in a specific wavelength band and transmitting light other than the specific wavelength band therethrough.

18 Claims, 25 Drawing Sheets

(56) References Cited

FOREIGN PATENT DOCUMENTS

| SG | 173280 | 8/2011 |
|---|---|---|
| WO | 2005087680 A1 | 9/2005 |
| WO | 2007005357 | 1/2007 |

OTHER PUBLICATIONS

Japanese Divisional Application, filed Oct. 18, 2011 and assigned application serial No. 2011-229203, associated with Japanese Patent Application U.S. Appl. No. 2010-137785, filed Jun. 16, 2010. (62 pages).

* cited by examiner

OPTICAL BODY WITH DIFFUSION REFLECTIVITY, WALL MEMBER, FITTING, AND SOLAR SHADING DEVICE

CROSS REFERENCES TO RELATED APPLICATIONS

The present disclosure claims priority to Japanese Priority Patent Application JP 2010-137785 filed in the Japan Patent Office on Jun. 16, 2010, the entire contents of which are hereby incorporated by reference.

BACKGROUND

The present technology relates to an optical body, a wall member, a fitting, and a solar shading device. More particularly, the present technology relates to an optical body for diffusely reflecting incident light.

From the viewpoint of reducing an air conditioning load, there is marketed a window film for solar shading. A film for reflecting the sunlight is also marketed as one example of the solar shading technique. To produce such a film, various techniques are already disclosed which employ, as a reflecting layer, an optical multilayer film, a metal-containing film, a transparent electroconductive film, etc. (see, e.g., the pamphlet of International Publication No. 05/087680).

However, that type of reflecting layer is formed on a flat window glass, and the incident sunlight is just specularly (regularly) reflected. Therefore, the light incoming from the sky and specularly reflected by the flat window glass reaches other buildings and the ground in the nearby outdoor where the light is absorbed and converted to heat, thus raising the ambient temperature. Accordingly, a local temperature rise occurs in the surroundings of a building in which all windows are coated with the above-mentioned type of reflecting layer. This gives rise to the problems that, in urban areas, a heat island phenomenon is accelerated and grass does not grow in areas irradiated with the reflected light.

SUMMARY

It is desirable to provide an optical body, an optical body manufacturing method, a window member, a fitting, and a solar shading device, which can suppress acceleration of the heat-island phenomenon.

With the view of solving the above-mentioned problems in the related art, the inventors have conducted intensive studies on an optical body capable of directionally reflecting the sunlight in direction other than the direction in which the incident light is specularly reflected. As a result, the inventors have succeeded in providing an optical body that includes a first optical layer having a concave-convex surface in which structures are arrayed at a regular pitch, a reflecting layer formed on the concave-convex surface, and a second optical layer formed on the reflecting layer to embed the concave-convex surface.

However, when viewing an electric lamp at a far distance in the night through the above-mentioned optical body, a diffraction pattern appears. As a result of intensively conducting studies with intent to suppress the occurrence of such a diffraction pattern, the inventors have found that the occurrence of the diffraction pattern can be suppressed by forming the concave-convex surface of the first optical layer in a random shape.

Embodiments of the present technology have been accomplished based on the above-described finding.

According to one embodiment of the present technology, there is provided an optical body including a first optical layer having a random concave-convex surface, a reflecting layer formed on the concave-convex surface, and a second optical layer formed on the reflecting layer to embed the concave-convex surface, wherein the reflecting layer is a wavelength-selective reflecting layer for diffusely reflecting, of incident light, light in a specific wavelength band and transmitting light other than the specific wavelength band therethrough.

According to another embodiment of the present technology, there is provided an optical body including a first optical layer having a random concave-convex surface, a reflecting layer formed on the concave-convex surface, and a second optical layer formed on the reflecting layer to embed the concave-convex surface, wherein the reflecting layer is a semi-transmissive layer for diffusely reflecting part of incident light and transmitting the remaining light therethrough.

According to still another embodiment of the present technology, there is provided an optical body manufacturing method including the steps of forming a first optical layer having a random concave-convex surface, forming a reflecting layer on the concave-convex surface, and forming a second optical layer on the reflecting layer to embed the concave-convex surface, wherein the reflecting layer is a wavelength-selective reflecting layer for diffusely reflecting light in a specific wavelength band and transmitting light other than the specific wavelength band therethrough.

According to still another embodiment of the present technology, there is provided an optical body manufacturing method including the steps of forming a first optical layer having a random concave-convex surface, forming a reflecting layer on the concave-convex surface, and forming a second optical layer on the reflecting layer to embed the concave-convex surface, wherein the reflecting layer is a semi-transmissive layer for diffusely reflecting part of incident light and transmitting the remaining light therethrough.

With the embodiments of the present technology, as described above, since the wavelength-selective reflecting layer or the semi-transmissive layer is formed on the random concave-convex surface of the first optical layer, the light in the specific wavelength band or the part of the incident light can be diffusely reflected. Also, since the random concave-convex surface is formed in the first optical layer and the reflecting layer is formed on the random concave-convex surface, the occurrence of a diffraction pattern can be suppressed. Further, since the second optical layer is formed on the reflecting layer to embed the random concave-convex surface of the first optical layer, a transmission image through the optical body can be clearly viewed.

Thus, with the embodiments of the present technology, acceleration of the heat-island phenomenon can be suppressed. Further, the occurrence of a diffraction pattern can be suppressed.

Additional features and advantages are described herein, and will be apparent from the following Detailed Description and the figures.

DETAILED DESCRIPTION

Embodiments of the present application will be described below in detail with reference to the drawings.

1. First embodiment (in which an optical film is a wavelength-selective film having diffuse reflective power)

2. Second embodiment (in which an optical film is a semi-transmissive film having diffuse reflective power)

3. Third embodiment (in which an optical film includes a light scatterer)

4. Fourth embodiment (in which an optical film includes a self-cleaning effective layer)

5. Fifth embodiment (in which a diffusely reflecting surface is formed by using beads)

6. Sixth embodiment (in which an optical film is applied to a window blind)

7. Seventh embodiment (in which an optical film is applied to a rolling screen device)

8. Eighth embodiment (in which an optical film is applied to a fitting)

1. First Embodiment

Structure of Optical Film

Figure 1A:
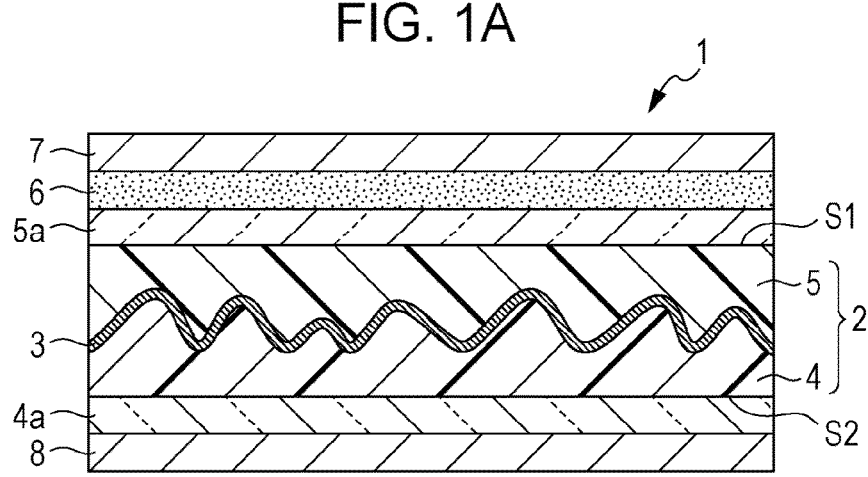
FIG. 1A is a sectional view illustrating one example of structure of an optical film according to a first embodiment.
Figure 1B:
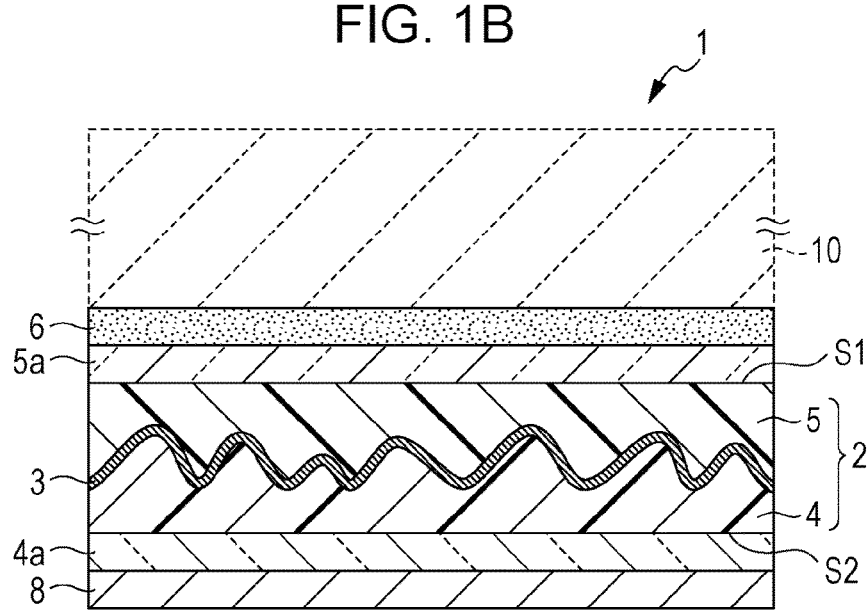
FIG. 1B is a sectional view illustrating an example in which the optical film according to the first embodiment is affixed to an adherend (i.e., a target to which the optical film is to be affixed)

FIG. 1A is a sectional view illustrating one example of structure of an optical film 1 according to a first embodiment, and FIG. 1B is a sectional view illustrating an example in which the optical film according to the first embodiment is affixed to an adherend. The optical film 1, serving as an optical body, is a wavelength-selective optical film having diffuse reflective power. The wavelength-selective optical film having diffuse reflective power diffusely reflects, of incident light, light in a specific wavelength band, while transmitting light other than the specific wavelength band therethrough. The optical film 1 preferably has a belt-like shape. The optical film 1 having a belt-like shape can be easily fabricated with a roll-to-roll process. Further, the belt-like optical film 1 can be easily handled by winding it into a roll.

As illustrated in FIG. 1A, the optical film 1 includes an optical layer 2 having an interface formed therein in a random concave-convex shape, and a wavelength-selective reflecting layer 3 formed at the interface in the optical layer 2. The optical layer 2 includes a first optical layer 4 having a first surface in a random concave-convex shape, and a second optical layer 5 having a second surface in a random concave-convex shape. The interface in the optical layer 2 is formed by the first and second surfaces each having the random concave-convex shape, which are arranged to face each other. Stated another way, the optical film 1 includes the first optical layer 4 having a random concave-convex surface, the wavelength-selective reflecting layer 3 formed on the random concave-convex surface of the first optical layer 4, and the second optical layer 5 formed on the wavelength-selective reflecting layer 3 so as to embed the random concave-convex surface on which the wavelength-selective reflecting layer 3 is formed. The optical film 1 has an incident surface S1 on which light, such as the sunlight, is incident, and an emergent surface S2 from which part of the light incident on the incident surface S1 emerges, the part having passed through the optical film 1. The optical film 1 is suitably applied to inner wall members, outer wall members, window members, wall materials, and so on. Further, the optical film 1 is suitably applied to a slat (one example of a solar shading member) of a window blind (shade) and a screen (another example of the solar shading member) of a rolling screen device. Moreover, the optical film 1 is suitably employed as an optical body that is disposed in a lighting portion of a fitting (i.e., an interior member or an exterior member), such as a shoji (i.e., a paper-made and/or glass-fitted sliding door).

The optical film 1 may further include a first base 4a, when necessary, on the side providing the emergent surface S2 of the optical layer 2. The optical film 1 may further include a second base 5a, when necessary, on the side providing the incident surface S1 of the optical layer 2. When the optical film 1 includes the first base 4a and/or the second base 5a, optical characteristics described later, such as transparency and color of the transmitted light, are preferably satisfied in a state where the optical film 1 includes the first base 4a and/or the second base 5a.

The optical film 1 may further include an affixing layer 6, when necessary. The affixing layer 6 is formed on one of the incident surface S1 and the emergent surface S2 of the optical film 1, which is to be affixed to a window member 10. Thus, the optical film 1 is affixed to the indoor or outdoor side of the window member 10, i.e., the adherend, with the affixing layer 6 interposed therebetween. The affixing layer 6 can be formed, for example, as a bonding layer containing a bond (e.g., a UV-cured resin or a two-liquid mixed resin) as a main component, or as an adhesive layer containing an adhesive (e.g., a PSA (Pressure Sensitive Adhesive)) as a main component. When the affixing layer 6 is the adhesive layer, a peel-off layer 7 is preferably further formed on the affixing layer 6. This enables the optical film 1 to be easily affixed, just by peeling off the peel-off layer 7, to the adherend, e.g., the window member 10, with the affixing layer 6 interposed therebetween.

From the viewpoint of increasing adhesion between the second base 5a and one or both of the affixing layer 6 and the second optical layer 5, the optical film 1 may further include a primer layer (not shown) between the second base 5a and one or both of the affixing layer 6 and the second optical layer 5. Also, from the viewpoint of increasing adhesion at the same location(s), it is preferable to carry out ordinary physical pretreatment instead of or in addition to forming the primer layer. The ordinary physical pretreatment includes, e.g., plasma treatment or corona treatment.

The optical film 1 may further include a barrier layer (not shown) on one of the incident surface S1 and the emergent surface S2, which one is affixed to the adherend, e.g., the window member 10, or between that one surface and the wavelength-selective reflecting layer 3. With the presence of the barrier layer, it is possible to reduce diffusion of moisture toward the wavelength-selective reflecting layer 3 from the incident surface S1 or the emergent surface S2 and to suppress deterioration of a metal, etc. contained in the wavelength-selective reflecting layer 3. Accordingly, durability of the optical film 1 can be improved.

The optical film 1 may further include a hard coat layer 8 from the viewpoint of giving the surface of the optical film 1 with resistance against excoriation, scratching, etc. The hard coat layer 8 is preferably formed on one of the incident surface S1 and the emergent surface S2 of the optical film 1, which one is positioned on the opposite side to the surface affixed to the adherend, e.g., the window member 10. A water-repellent or hydrophilic layer may be further formed on the incident surface S1 or the emergent surface S2 of the optical film 1 from the viewpoint of providing an antifouling property, etc. The layer having such a function may be formed, for example, directly on the optical layer 2 or on one of various functional layers such as the hard coat layer 8.

The optical film 1 preferably has flexibility from the viewpoint of enabling the optical film 1 to be easily affixed to the adherend, e.g., the window member 10. Herein, the term "film" is to be construed as including a sheet. In other words, the optical film 1 includes an optical sheet as well.

The optical film 1 preferably has transparency. The transparency preferably falls within a later-described range of transmission image clarity. The difference in refractive index between the first optical layer 4 and the second optical layer 5 is preferably 0.010 or less, more preferably 0.008 or less, and even more preferably 0.005 or less. If the difference in refractive index exceeds 0.010, a transmission image tends to blur in appearance. When the difference in refractive index is more than 0.008 and not more than 0.010, there are no problems in daily life though depending on outdoor brightness. When the difference in refractive index is more than 0.005 and not more than 0.008, the outdoor sight can be clearly viewed although it is unpleasant that an image of a bright object is slightly blurred upon carefully looking at the perimeter of the bright object. When the difference in refractive index is 0.005 or less, a clear image can be observed regardless of the brightness of the transmission image. One of the first optical layer 4 and the second optical layer 5, which one is positioned on the side affixed to, e.g., the window member 10, may contain an adhesive as a main component. With such a feature, the optical film 1 can be affixed to, e.g., the window member 10 by directly attaching the first optical layer 4 or the second optical layer 5 that contains the adhesive as a main component. In that case, the difference in refractive index with respect to the adhesive is preferably within the above-described range.

The first optical layer 4 and the second optical layer 5 preferably have the same optical characteristics, such as the refractive index. More specifically, the first optical layer 4 and the second optical layer 5 are preferably made of the same material, e.g., the same resin material, having transparency in the visible range. By using the same material to form the first optical layer 4 and the second optical layer 5, the refractive indexes of both the optical layers are equal to each other, and hence transparency to visible light can be improved. However, care is to be paid to such a point that, even when the starting material is the same, the refractive indexes of finally formed layers may differ from each other depending on, e.g., curing conditions in a film forming process. On the other hand, when the first optical layer 4 and the second optical layer 5 are made of different materials, a transmission image tends to blur for the reason that light is refracted at the wavelength-selective reflecting layer 3, which provides a boundary, due to the difference in refractive index between the optical layers 4 and 5. In particular, there is a tendency that when carefully looking at a transmission image of a bright object, blurring of the transmission image is conspicuously observed. Note that, in order to adjust a value of the refractive index, an additive may be mixed in the first optical layer 4 and/or the second optical layer 5.

The first optical layer 4 and the second optical layer 5 preferably have transparency in the visible range. Herein, the term "transparency" is defined as having two meanings, i.e., as not absorbing light and not scattering light. When the term "transparency" is generally used, it often implies the former meaning alone. However, the optical film 1 according to the first embodiment preferably has the transparency in both the meanings. A currently employed retroreflector is intended to visually confirm light reflected from road signs, clothes for night workers, etc. to provide a noticeable indication. Therefore, even when the retroreflector has a scattering property, light reflected from an underlying reflector can be visually observed if the retroreflector is in close contact with the underlying reflector. Such a phenomenon is based on the same principle as that an image can be visually confirmed even when antiglare treatment providing a scattering property is applied to a front surface of an image display for the purpose of imparting an antiglare property. In contrast, the optical film 1 according to the first embodiment preferably does not scatter light for the reason that the optical film 1 is featured in transmitting light other than the diffusely reflected light of specific wavelengths, and that the optical film 1 is affixed to a transmissive member transmitting primarily light of transmission wavelengths, thus allowing the transmitted light to be observed. Depending on usage, however, the second optical layer 5 may be intentionally provided with the scattering property.

The optical film 1 is preferably used in such a way that it is affixed to a rigid member, e.g., the window member 10, which has transmissivity primarily to the light having passed through the optical film and falling in bands other than the specific wavelengths, with, e.g., an adhesive interposed therebetween. Examples of the window member 10 include architectural window members for high-rise buildings, houses, etc. and window members for vehicles. When the optical film 1 is applied to the architectural window members, it is preferably applied to the window member 10 that is oriented to face, particularly, in some direction within a range from east to south and further to west (e.g., within a range from southeast to southwest). This is because, by applying the optical film 1 to the window member 10 oriented as mentioned above, heat rays can be more effectively reflected. The optical film 1 can be applied to not only a single-layer window glass, but also a special glass, such as a multilayer glass. Further, the window member 10 is not limited to a glass-made member, and it may be a member made of a high polymeric material having transparency. The optical layer 2 preferably has transparency in the visible range. The reason is that, with the optical layer 2 having transparency in the visible range, when the optical film 1 is affixed to the window member 10, e.g., the window glass, visible light is allowed to pass through the optical film 1 and lighting with the sunlight can be ensured. The optical film 1 may be affixed to not only an inner surface of a glass pane, but also an outer surface thereof.

Further, the optical film 1 can be used in combination with an additional heat-ray cutoff film. For example, a light absorption coating may be disposed at the interface between air and the optical film 1 (i.e., on the outermost surface of the optical film 1). Still further, the optical film 1 can be used in combination with a hard coat layer, an ultraviolet cutoff layer, a surface anti-reflection layer, etc. When one or more of those functional layers are used in a combined manner, the functional layer(s) is preferably disposed at the interface between the optical film 1 and air. However, the ultraviolet cutoff layer is to be disposed on the side closer to the sun than the optical film 1. Thus, particularly when the optical film 1 is affixed to an inner surface of the window glass on the side facing the interior of a room, the ultraviolet cutoff layer is desirably disposed between the inner surface of the window glass and the optical film 1. In that case, an ultraviolet absorber may be mixed in an affixing layer between the inner surface of the window glass and the optical film 1.

Depending on the usage of the optical film 1, the optical film 1 may be colored to have a visually attractive design. When the visually attractive design is given to the optical film 1, at least one of the first optical layer 4 and the second optical layer 5 is preferably formed so as to absorb primarily light in a particular wavelength band within the visible range to such an extent as not reducing transparency.

Figure 2:
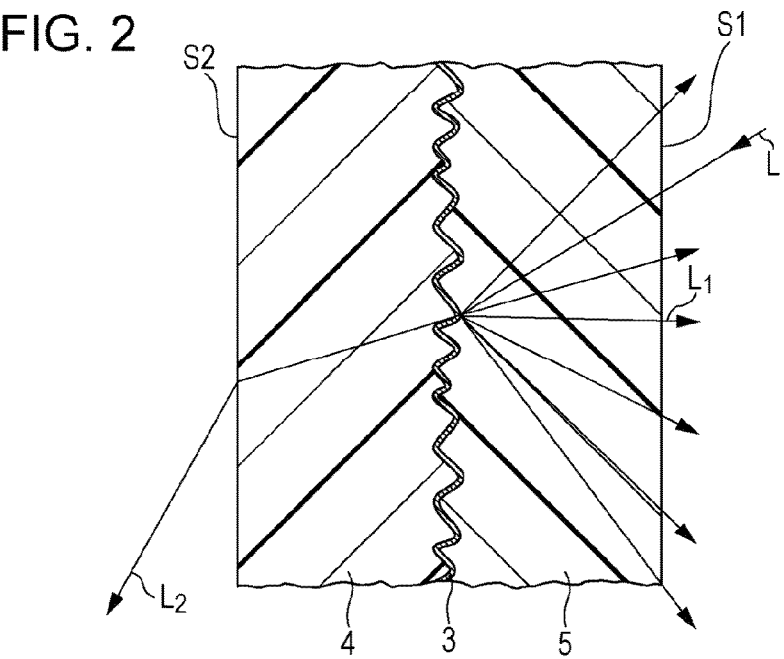
FIG. 2 is an enlarged sectional view to explain the function of the optical film according to the first embodiment.

FIG. 2 is an enlarged sectional to explain the function of the optical film according to the first embodiment. The optical film 1 has the incident surface S1 on which light L is incident. The optical film 1 diffusely reflects light L1 in a specific wavelength band, which is part of the light L entering the incident surface S1, while transmitting light L2 other than the specific wavelength band. Also, the optical film 1 has transparency to the light L2 other than the specific wavelength band. The transparency preferably falls within the later-described range of transmission image clarity. Further, a diffuse reflection characteristic may be given with anisotropy. For example, when the optical film 1 has a belt-like shape, the diffuse reflection characteristic may have anisotropy between the longitudinal (lengthwise) direction and the transverse (widthwise) direction thereof.

The diffusely-reflected light in the specific wavelength band and the transmitted light other than the specific wavelength band are set differently depending on the usage of the optical film 1. For example, when the optical film 1 is applied to the window member 10, it is preferable that the diffusely-reflected light in the specific wavelength band is near infrared light and the transmitted light other than the specific wavelength band is visible light. In more detail, the diffusely-reflected light in the specific wavelength band is preferably near infrared light primarily falling in a wavelength band of 780 nm to 2100 nm. By reflecting the near infrared light, a temperature rise inside a building can be suppressed when the optical film 1 is affixed to the window member 10 such as the window glass. Accordingly, a cooling load can be reduced and energy saving can be achieved. Herein, the expression "reflect" implies that the reflectance in a specific wavelength band, e.g., in the near infrared range, is preferably 30% or more, more preferably 50% or more, and even more preferably 80% or more. The expression "transmit" implies that the transmittance in a specific wavelength band, e.g., in the visible range, is preferably 30% or more, more preferably 50% or more, and even more preferably 70% or more.

A value of the transmission image clarity in the wavelength band where the optical film 1 has transmissivity is preferably 50 or larger, more preferably 60 or larger, and even more preferably 75 or larger when an optical comb with a comb width of 0.5 mm is used. If the value of the transmission image clarity is smaller than 50, a transmission image tends to blur in appearance. When the value of the transmission image clarity is not smaller than 50 and smaller than 60, there are no problems in daily life though depending on outdoor brightness. When the value of the transmission image clarity is not smaller than 60 and smaller than 75, the outdoor sight can be clearly viewed although it is unpleasant that an image of a bright object is slightly blurred upon carefully looking at the perimeter of the bright object. When the value of the transmission image clarity is not smaller than 75, a diffraction pattern is hardly displeasing. Further, a total of values of the transmission image clarity measured using optical combs with comb widths of 0.125 mm, 0.5 mm, 1.0 mm and 2.0 mm is preferably 230 or larger, more preferably 270 or larger, and even more preferably 350 or larger. If the total value of the transmission image clarity is smaller than 230, a transmission image tends to blur in appearance. When the total value of the transmission image clarity is not smaller than 230 and smaller than 270, there are no problems in daily life though depending on outdoor brightness. When the total value of the transmission image clarity is not smaller than 270 and smaller than 350, the outdoor sight can be clearly viewed although only a very bright object, such as a light source, causes a displeasing diffraction pattern. When the total value of the transmission image clarity is not smaller than 350, the diffraction pattern is hardly displeasing. Herein, the value of the transmission image clarity is measured in conformity with JIS K7105 by using ICM-1T made by Suga Test Instruments Co., Ltd. When the wavelength to be transmitted differs from that of the D65 light source, the measurement is preferably performed after calibration using a filter having the wavelength to be transmitted.

Haze occurred in the wavelength band where the optical film 1 has transmissivity is preferably 6% or less, more preferably 4% or less, and even more preferably 2% or less. If the haze exceeds 6%, the transmitted light is scattered and a view is obscured. Herein, the haze is measured in accordance with the measurement method stipulated in JIS K7136 by using HM-150 made by Murakami Color Research Laboratory Co., Ltd. When the wavelength to be transmitted differs from that of the D65 light source, the measurement is preferably performed after calibration using a filter having the wavelength to be transmitted. The incident surface S1, preferably both the incident surface S1 and the emergent surface S2, of the optical film 1 have smoothness at such a level as not degrading the transmission image clarity. More specifically, arithmetic mean roughness Ra of the incident surface S1 and the emergent surface S2 is preferably 0.08 μm or less, more preferably 0.06 μm or less, and even more preferably 0.04 μm or less. Note that the arithmetic mean roughness Ra is obtained as a roughness parameter by measuring the surface roughness of the incident (emergent) surface and deriving a roughness curve from a two-dimensional profile curve. Measurement conditions are set in conformity with JIS B0601:2001. Details of a measuring apparatus and the measurement conditions are as follows;

measuring apparatus: full-automated fine shape measuring machine SURFCODER ET4000A (made by Kosaka Laboratory Ltd.), $\lambda c$=0.8 mm, evaluation length: 4 mm, cutoff: ×5, and data sampling interval: 0.5 μm.

The first optical layer 4, the second optical layer 5, and the wavelength-selective reflecting layer 3, which constitute the optical film 1, will be described in more detail below.

First Optical Layer and Second Optical Layer

The first optical layer 4 serves to, for example, support and protect the wavelength-selective reflecting layer 3. The first optical layer 4 is made of a layer preferably containing, e.g., a resin as a main component from the viewpoint of giving the optical film 1 with flexibility. For example, one of two principal surfaces of the first optical layer 4 is a smooth surface and the other is a random concave-convex surface (first surface). The wavelength-selective reflecting layer 3 is formed on the random concave-convex surface of the first optical layer 4.

The second optical layer 5 serves to protect the wavelength-selective reflecting layer 3 by embedding the first surface (random concave-convex surface) of the first optical layer 4 on which the wavelength-selective reflecting layer 3 is formed. The second optical layer 5 is made of a layer preferably containing, e.g., a resin as a main component from the viewpoint of giving the optical film 1 with flexibility. For example, one of two principal surfaces of the second optical layer 5 is a smooth surface and the other is a random concave-convex surface (second surface). The random concave-convex surface of the first optical layer 4 and the random concave-convex surface of the second optical layer 5 are reversed to each other in a random concave-convex relation. Since the concave-convex surface of the first optical layer 4 and the concave-convex surface of the second optical layer 5 differ from each other only in that they are reversed to each other in a random concave-convex relation, the following description is made about the concave-convex surface of the first optical layer 4.

The first optical layer 4 preferably contains, as a main component, a resin of the type exhibiting a small reduction in its storage (elastic) modulus at 100° C. and no significant difference in storage modulus between 25° C. and 100° C. In more detail, the first optical layer 4 preferably contains a resin having the storage modulus of $3 \times 10^9$ Pa or less at 25° C. and the storage modulus of $3 \times 10^7$ Pa or more at 100° C. The first optical layer 4 is preferably made of one type of resin, but it may contain two or more types of resins. Further, the first optical layer 4 may be mixed with an additive, when necessary.

When the first optical layer 4 contains, as a main component, the resin of the type exhibiting a small reduction in its storage modulus at 100° C. and no significant difference in storage modulus between 25° C. and 100° C. as described above, the first optical layer 4 can substantially maintain the interface shape as per design even when a process under application of heat or both of heat and pressure is carried out after forming the random concave-convex surface (first surface) of the first optical layer 4. On the other hand, if the first optical layer 4 contains, as a main component, a resin of the type exhibiting a large reduction in its storage modulus at 100° C. and a significant difference in storage modulus between 25° C. and 100° C., the interface shape is deformed from the designed shape to such a large extent that the optical film 1 may be curled.

The process under application of heat includes not only a process of directly applying heat to the optical film 1 or components thereof, such as annealing, but also a process in which temperature at the surface of a formed film is locally raised and heat is indirectly applied to the film surface, for example, during formation of a thin film and during curing of a resin composition, and a process in which the temperature of a master is raised upon irradiation with energy rays and heat is indirectly applied to the optical film. Further, the effect resulting from restricting the numerical range of the storage modulus as described above is not limited to the case using the particular type of resin and can be similarly obtained when a thermoplastic resin, a thermosetting resin, and an energy-ray irradiation resin are used.

The storage modulus of the first optical layer 4 can be confirmed, for example, as follows. When the surface of the first optical layer 4 is exposed, the storage modulus of the first optical layer 4 can be confirmed by measuring the storage modulus of the exposed surface with a micro-hardness tester. When the first base 4a, etc. are formed on the surface of the first optical layer 4, the storage modulus of the first optical layer 4 can be confirmed by peeling off the first base 4a, etc. to make the surface of the first optical layer 4 exposed, and then measuring the storage modulus of the exposed surface with a micro-hardness tester.

A reduction in the storage modulus at high temperatures can be suppressed, for example, by a method of adjusting, e.g., the length and the kind of a side chain when the thermoplastic resin is used, and by a method of adjusting, e.g., the number of cross-linking points and the molecular structure of a cross-linking agent when the thermosetting resin or the energy-ray irradiation resin is used. However, it is preferable that the characteristics demanded for the resin material itself are not degraded with such a structural change. Depending on the type of the cross-linking agent, for example, the storage modulus at about room temperature may be increased to such an extent that a resin film becomes brittle, or that the resin film is curved or curled due to large shrinkage. It is, therefore, preferable to properly select the type of the cross-linking agent depending on the demanded characteristics.

When the first optical layer 4 contains a crystalline high-polymeric material as a main component, it preferably contains, as a main component, a resin having the glass transition point higher than a maximum temperature during a manufacturing process and exhibiting a small reduction in the storage modulus at the maximum temperature during the manufacturing process. If a resin having the glass transition point in the range of the room temperature 25° C. to the maximum temperature during the manufacturing process and exhibiting a large reduction in the storage modulus at the maximum temperature during the manufacturing process is used, a difficulty occurs in maintaining the ideal interface shape as per design during the manufacturing process.

When the first optical layer 4 contains a non-crystalline (amorphous) high-polymeric material as a main component, it preferably contains, as a main component, a resin having the melting point higher than the maximum temperature during the manufacturing process and exhibiting a small reduction in the storage modulus at the maximum temperature during a manufacturing process. If a resin having the melting point in the range of the room temperature 25° C. to the maximum temperature during the manufacturing process and exhibiting a large reduction in the storage modulus at the maximum temperature during the manufacturing process is used, a difficulty occurs in maintaining the ideal interface shape as per design during the manufacturing process.

Herein, the expression "maximum temperature during the manufacturing process" implies a maximum temperature at the random concave-convex surface (first surface) of the first optical layer 4 during the manufacturing process. Preferably, the second optical layer 5 also satisfies the above-mentioned numerical range of the storage modulus and the above-mentioned temperature range of the glass transition point.

Thus, at least one of the first optical layer 4 and the second optical layer 5 preferably contains the resin having the storage modulus of $3 \times 10^9$ Pa or less at 25° C. On such a condition, the optical film 1 can be given with flexibility at the room temperature 25° C. and can be manufactured with the roll-to-roll process.

The first base 4a and the second base 5a have transparency in an exemplary case. Each base is preferably in the form of a film from the viewpoint of giving the optical film 1 with flexibility, but the form of the base is not particularly limited to the film. The first base 4a and the second base 5a can be each formed by using, e.g., general high polymeric materials. Examples of the general high polymeric materials include triacetylcellulose (TAC), polyester (TPEE), polyethylene terephthalate (PET), polyimide (PI), polyamide (PA), aramid, polyethylene (PE), polyacrylate, polyethersulfone, polysulfone, polypropylene (PP), diacetyl cellulose, polyvinyl chloride, acrylic resin (PMMA), polycarbonate (PC), epoxy resin, urea resin, urethane resin, and melamine resin. However, the materials of the first base 4a and the second base 5a are not limited to the above-mentioned particular examples. The thickness of each of the first base 4a and the second base 5a is preferably 38 to 100 μm from the viewpoint of productivity, but it is not limited to such a particular range. The first base 4a or the second base 5a is preferably transmissive to an energy ray. The reason is that when the first base 4a or the second base 5a is transmissive to an energy ray, an energy-ray curable resin interposed between the first base 4a or the second base 5a and the wavelength-selective reflecting layer 3 can be cured, as described later, by irradiating the energy-ray curable resin with the energy ray from the side including the first base 4a or the second base 5a.

The first optical layer 4 and the second optical layer 5 have transparency in an exemplary case. The first optical layer 4 and the second optical layer 5 are each obtained, for example, by curing a resin composition. As the resin composition, an energy-ray curable resin capable of being cured upon irradiation with light or an electron beam, or a thermosetting resin capable of being cured upon application of heat is preferably used from the viewpoint of easiness in production. As the energy-ray curable resin, a photosensitive resin composition capable of being cured upon irradiation with light is preferable, and an ultraviolet curable resin composition capable of being cured upon irradiation with an ultraviolet ray is most preferable. From the viewpoint of increasing adhesion between the first optical layer 4 or the second optical layer 5 and the wavelength-selective reflecting layer 3, the resin composition preferably further contains a compound containing phosphoric acid, a compound containing succinic acid, and a compound containing butyrolactone. The compound containing phosphoric acid may be, e.g., (meth)acrylate containing phosphoric acid, preferably a (meth)acryl monomer or oligomer having phosphoric acid in a functional group. The compound containing succinic acid may be, e.g., (meth)acrylate containing succinic acid, preferably a (meth)acryl monomer or oligomer having succinic acid in a functional group. The compound containing butyrolactone may be, e.g., (meth) acrylate containing butyrolactone, preferably a (meth)acryl monomer or oligomer having butyrolactone in a functional group.

The ultraviolet curable resin composition contains, e.g., (meth)acrylate and a photopolymerization initiator. The ultraviolet curable resin composition may further contain, when necessary, a photo-stabilizer, a flame retardant, a leveling agent, and/or an anti-oxidant.

As the acrylate, a monomer and/or an oligomer having two or more (meth)acryloyl groups is preferably used. Examples of such a monomer and/or oligomer include urethane(meth) acrylate, epoxy(meth)acrylate, polyester(meth)acrylate, polyol(meth)acrylate, polyether(meth)acrylate, and melamine(meth)acrylate. Herein, the term "(meth)acryloyl group" implies an acryloyl group or a methacryloyl group. The term "oligomer" used herein implies a molecule having molecular weight of 500 or more to 60000 or less.

The photopolymerization initiator used here can be selected, as appropriate, from among general materials. As examples of the general materials, benzophenone derivatives, acetophenone derivatives, anthraquinone derivatives, etc. can be used alone or in combination. An amount of the photopolymerization initiator mixed is preferably 0.1% by mass or more and 10% by mass or less of the solid content. If the amount of the photopolymerization initiator mixed is less than 0.1% by mass, photo-curability is reduced to such a level as being not suitable for industrial production from the practical point of view. On the other hand, if the amount of the photopolymerization initiator mixed exceeds 10% by mass, an odor tends to remain in a formed coating when an amount of light emitted for the irradiation is insufficient. Herein, the term "solid content" implies all components constituting the first optical layer 4 or the second optical layer 5 after being cured. The solid content includes, for example, the acrylate, the photopolymerization initiator, etc.

Preferably, the resin has such a property that a structure can be transferred to the resin upon, e.g., irradiation with the energy ray or application of heat. Any type of resin, including a vinyl-based resin, an epoxy-based resin, a thermoplastic resin, etc., can be used as long as the resin satisfies the above-described requirements for the refractive index.

The resin may be mixed with an oligomer to reduce curing shrinkage. The resin may further contain, e.g., polyisocyanate as a curing agent. In consideration of adhesion between the first optical layer 4 or the second optical layer 5 and the adjacent layer, the resin may be further mixed with suitable one or more of monomers having a hydroxyl group, a carboxyl group and a phosphoric group; polyols; coupling agents such as carboxylic acid, silane, aluminum and titanium; and various chelating agents.

The resin composition preferably further contains a cross-linking agent. In particular, a cyclic cross-linking agent is preferably used as the cross-linking agent. By using the cross-linking agent, the resin can be made heat-resistant without greatly changing the storage modulus at the room temperature. If the storage modulus at the room temperature is greatly changed, the optical film 1 may become brittle and a difficulty may occur in fabricating the optical film 1 with the roll-to-roll process. Examples of the cyclic cross-linking agent include dioxaneglycol diacrylate, tricyclodecanedimethanol diacrylate, tricyclodecanedimethanol dimethacrylate, ethylene oxide-modified isocyanurate diacrylate, ethylene oxide-modified isocyanurate triacrylate, and caprolactone-modified tris(acryloxyethyl) isocyanurate.

Preferably, the first base 4a or the second base 5a has water vapor permeability lower than that of the first optical layer 4 or the second optical layer 5, respectively. For example, when the first optical layer 4 is formed by using the energy-ray curable resin, e.g., urethane acrylate, the first base 4a is preferably formed by using a resin having water vapor permeability lower than that of the first optical layer 4 and being transmissive to the energy ray, e.g., polyethylene terephthalate (PET). As a result, diffusion of moisture toward the wavelength-selective reflecting layer 3 from the incident surface S1 or the emergent surface S2 can be reduced and deterioration of a metal, etc. contained in the wavelength-selective reflecting layer 3 can be suppressed. Hence, durability of the optical film 1 can be improved. Note that the water vapor permeability of PET having a thickness of 75 μm is about 10 g/m$^2$/day (40° C., 90% RH).

Preferably, at least one of the first optical layer 4 and the second optical layer 5 contains a functional group having high polarity, and the content of such a functional group differs between the first optical layer 4 and the second optical layer 5. More preferably, both the first optical layer 4 and the second optical layer 5 contain a phosphoric compound (e.g., phosphoric ester), and the content of the phosphoric compound differs between the first optical layer 4 and the second optical layer 5. The difference in the content of the phosphoric compound between the first optical layer 4 and the second optical layer 5 is preferably two or more times, more preferably five or more times, and even more preferably ten or more times.

When at least one of the first optical layer 4 and the second optical layer 5 contains the phosphoric compound, the wavelength-selective reflecting layer 3 preferably contains an oxide, a nitride, or an oxynitride in its surface contacting with the first optical layer 4 or the second optical layer 5 that contains the phosphoric compound. It is particularly preferable that the wavelength-selective reflecting layer 3 includes a layer, which contains zinc oxide (ZnO) or niobium oxide, in its surface contacting with the first optical layer 4 or the second optical layer 5 that contains the phosphoric compound. Such a feature is effective in increasing adhesion between the first optical layer 4 or the second optical layer 5 and the wavelength-selective reflecting layer 3. Another reason is that an anticorrosion effect is increased when the wavelength-selective reflecting layer 3 contains a metal, such as Ag. Additionally, the wavelength-selective reflecting layer 3 may contain a dopant, such as Al or Ga. The reason is that the dopant improves film quality and smoothness when a metal oxide layer is formed by, e.g., sputtering.

From the viewpoint of giving the optical film 1, the window member 10, etc. with a visually attractive design, at least one of the first optical layer 4 and the second optical layer 5 preferably has a characteristic of absorbing light in a particular wavelength band within the visible range. A pigment dispersed in the resin may be either an organic pigment or an inorganic pigment. In particular, an inorganic pigment having high weatherbility in itself is preferable. Practical examples of the inorganic pigment include zircone gray (Co, Ni-doped $ZrSiO_4$), praseodymium yellow (Pr-doped $ZrSiO_4$), chrome-titania yellow (Cr, Sb-doped $TiO_2$ or Cr, W-doped $TiO_2$), chrome green (such as $Cr_2O_3$), peacock blue ((CoZn)O (AlCr)$_2O_3$), Victoria green ((Al, Cr)$_2O_3$), deep blue (CoO.Al$_2O_3$.SiO$_2$), vanadium-zirconium blue (V-doped $ZrSiO_4$), chrome-tin pink (Cr-doped CaO.SnO$_2$.SiO$_2$), manganese pink (Mn-doped Al$_2O_3$), and salmon pink (Fe-doped $ZrSiO_4$). Examples of the organic pigment include an azo-based pigment and a phthalocyanine pigment.

Reflecting Layer

The wavelength-selective reflecting layer 3 serving as a partially reflecting layer diffusely reflects, of incident light entering the incident surface, light in a specific wavelength band, but it transmits light other than the specific wavelength band therethrough. The wavelength-selective reflecting layer 3 is, for example, a multilayer (stacked) film, a transparent electroconductive layer, or a functional layer. Alternatively, the wavelength-selective reflecting layer 3 may be formed by using two or more of the multilayer film, the transparent conductive layer, and the functional layer in a combined manner. A mean film thickness of the wavelength-selective reflecting layer 3 is preferably 20 μm or less, more preferably 5 μm or less, and even more preferably 1 μm or less. If the mean film thickness of the wavelength-selective reflecting layer 3 exceeds 20 μm, the length of an optical path in which the transmitted light is refracted is increased, and the transmission image tends to distort in appearance. The wavelength-selective reflecting layer 3 can be formed, for example, by sputtering, vapor deposition, dip coating, or die coating.

The multilayer film, the transparent electroconductive layer, and the functional layer will be described below one by one.

Multilayer Film

The multilayer film is, for example, a film formed by alternately stacking a low refractive index layer and a high refractive index layer, which differ from each other in refractive index. As another example, the multilayer film is a film formed by alternately stacking a metal layer having a high reflectance in the infrared range and a high refractive index layer having a high refractive index in the visible range and serving as an anti-reflection layer. An optical transparent layer or a transparent electroconductive layer can be used as the high refractive index layer.

The metal layer having a high reflectance in the infrared range contains, as a main component, Au, Ag, Cu, Al, Ni, Cr, Ti, Pd, Co, Si, Ta, W, Mo or Ge alone, or an alloy containing two or more selected from among those elements, for example. Of those examples, Ag-, Cu-, Al-, Si- or Ge-based materials are preferable in consideration of practicability. When an alloy is used as the material of the metal layer, the metal layer preferably contains, as a main component, AlCu, AlTi, AlCr, AlCo, AlNdCu, AlMgSi, AgPdCu, AgPdTi, AgCuTi, AgPdCa, AgPdMg, AgPdFe, Ag, or SiB, for example. To retard corrosion of the metal layer, an additional material, such as Ti or Nd, is preferably mixed in the metal layer. In particular, when Ag is used as the material of the metal layer, it is preferable to mix the additional material.

The optical transparent layer is a layer having a high refractive index in the visible range and serving as an anti-reflection layer. The optical transparent layer contains, as a main component, a high-dielectric material, e.g., niobium oxide, tantalum oxide, or titanium oxide. The transparent electroconductive layer contains, as a main component, ZnO-based oxide or indium-doped tin oxide. The ZnO-based oxide can be, for example, at least one selected from among a group including zinc oxide (ZnO), gallium (Ga)- and aluminum (Al)-doped zinc oxide (GAZO), aluminum (Al)-doped zinc oxide (AZO), and gallium (Ga)-doped zinc oxide (GZO).

The refractive index of the high refractive index layer included in the multilayer film is preferably in the range of 1.7 or more to 2.6 or less, more preferably 1.8 or more to 2.6 or less, and even more preferably 1.9 or more to 2.6 or less. By setting the refractive index as mentioned above, anti-reflection can be realized in the visible range with a film that is so thin as not to cause cracking. Note that the refractive index is measured at a wavelength of 550 nm. The high refractive index layer is a layer containing, as a main component, a metal oxide, for example. In some cases, the metal oxide used here is preferably to be other than zinc oxide from the viewpoint of relaxing stresses in the layer and suppressing the occurrence of cracks. In particular, at least one selected from among a group including niobium oxide (e.g., niobium pentoxide), tantalum oxide (e.g., tantalum pentoxide), and titanium oxide is preferably used. A mean film thickness of the high refractive index layer is preferably 10 nm or more and 120 nm or less, more preferably 10 nm or more and 100 nm or less, and even more preferably 10 nm or more and 80 nm or less. If the mean film thickness is less than 10 nm, the high refractive index layer is more apt to reflect the visible light. On the other hand, if the mean film thickness exceeds 120 nm, the high refractive index layer is more apt to reduce transmittance and to cause cracking.

The multilayer film is not limited to a thin film made of an inorganic material, and it may be formed by stacking a thin film made of a high polymeric material, or a layer containing fine particles, etc. dispersed in a high polymeric material. Further, a thin buffer layer made of, e.g., Ti and having a thickness of several nanometers may be formed at the interface between the formed optical transparent layer and the adjacent layer for the purpose of preventing oxidation degradation of a metal in the underlying layer when the optical transparent layer is formed. Herein, the term "buffer layer" implies a layer that is self-oxidized to suppress oxidation of e.g., a metal layer as an underlying layer when an overlying layer is formed.

Transparent Electroconductive Layer

The transparent electroconductive layer is a layer containing, as a main component, an electroconductive material having transparency in the visible range. More specifically, the transparent electroconductive layer contains, as a main component, a transparent electroconductive material, e.g., tin oxide, zinc oxide, a material containing carbon nano-tubes, indium-doped tin oxide, indium-doped zinc oxide, and antimony-doped tin oxide. A layer alternatively usable here may contain nano-particles of the above-mentioned materials, or nano-particles, nano-rods or nano-wires of an electroconductive material, e.g., a metal, which are dispersed in a resin at a high density.

Functional Layer

The functional layer contains, as a main component, a chromic material of which reflection performance, for example, is reversibly changed upon application of an external stimulus. The term "chromic material" implies a material reversibly changing its structure upon application of an external stimulus, such as heat, light, or intrusive molecules. Examples of the chromic material usable here include a photochromic material, a thermochromic material, a gaschromic material, and an electrochromic material.

The photochromic material is a material reversibly changing its structure by the action of light. The photochromic material can reversibly change various physical properties, such as reflectance and color, upon irradiation with light, e.g., an ultraviolet ray. Transition metal oxides, such as $TiO_2$, $WO_3$, $MoO_3$, and $Nb_2O_5$, which are doped with Cr, Fe or Ni, for example, can be used as the photochromic material. Further, wavelength selectivity can be improved by stacking a layer of the photochromic material and a layer having a different refractive index from that of the former layer.

The thermochromic material is a material reversibly changing its structure by the action of heat. The thermochromic material can reversibly change various physical properties, such as reflectance and color, upon application of heat. For example, $VO_2$ can be used as the thermochromic material. Other elements, such as W, Mo and F, may also be added for the purpose of controlling the transition temperature and the transition curve. Further, a multilayer structure may be formed by sandwiching a thin film containing, as a main component, the thermochromic material, e.g., $VO_2$, between anti-reflection layers each containing, as a main component, a high refractive index material, e.g., $TiO_2$ or ITO.

A photonic lattice, such as a cholesteric liquid crystal, can also be used as the thermochromic material. The cholesteric liquid crystal can selectively reflect light of a specific wavelength depending on an interlayer distance, and the interlayer distance is changeable depending on temperature. Therefore, the physical properties, such as reflectance and color, of the cholesteric liquid crystal can be reversibly changed upon heating. In this connection, a reflection band can be widened by using several types of cholesteric liquid crystal layers having different interlayer distances.

The electrochromic material is a material reversibly changing various physical characteristics, such as reflectance and color, by the action of electricity. The electrochromic material can be provided, for example, as a material reversibly changing its structure upon application of voltage, for example. More specifically, a reflective light control material changing its reflection characteristic with doping or undoping of a proton, for example, can be used as the electrochromic material. The term "reflective light control material" implies a material capable of selectively controlling its optical property to desired one of a transparent state, a mirror state, and an intermediate state therebetween upon application of an external stimulus. Examples of the reflective light control material usable here include an alloy material containing, as a main component, a magnesium-nickel alloy material or a magnesium-titanium alloy material, $WO_3$, and materials in which needle crystals having selective reflective power are enclosed in microcapsules.

In practice, the functional layer can be constituted, for example, by successively stacking, on the second optical layer 5, the above-described alloy layer, a catalyst layer containing, e.g., Pd, a thin buffer layer made of, e.g., Al, an electrolyte layer made of, e.g., $Ta_2O_5$, an ion storage layer made of, e.g., $WO_3$ containing protons, and the transparent electroconductive layer. Alternatively, the functional layer can be constituted, for example, by successively stacking, on the second optical layer 5, the transparent electroconductive layer, the electrolyte layer, an electrochromic layer made of, e.g., $WO_3$, and the transparent electroconductive layer. In such a multilayer structure, when a voltage is applied between the transparent electroconductive layer and an opposed electrode, protons contained in the electrolyte layer are doped into or undoped from the alloy layer. As a result, the transmittance of the alloy layer is changed. Further, in order to increase the wavelength selectivity, the electrochromic material is desirably stacked with a high refractive index material, such as $TiO_2$ or ITO. As another usable multilayer structure, the transparent electroconductive layer, an optical transparent layer including microcapsules dispersed therein, and a transparent electrode may be stacked on the second optical layer 5. In that structure, when a voltage is applied between both the transparent electrodes, a transmissive state can be obtained in which needle crystals in the microcapsules are uniformly oriented, and when the voltage is eliminated, a wavelength-selective reflective state can be obtained in which the needle crystals are oriented at random.

Apparatus for Manufacturing Optical Film

Figure 3:
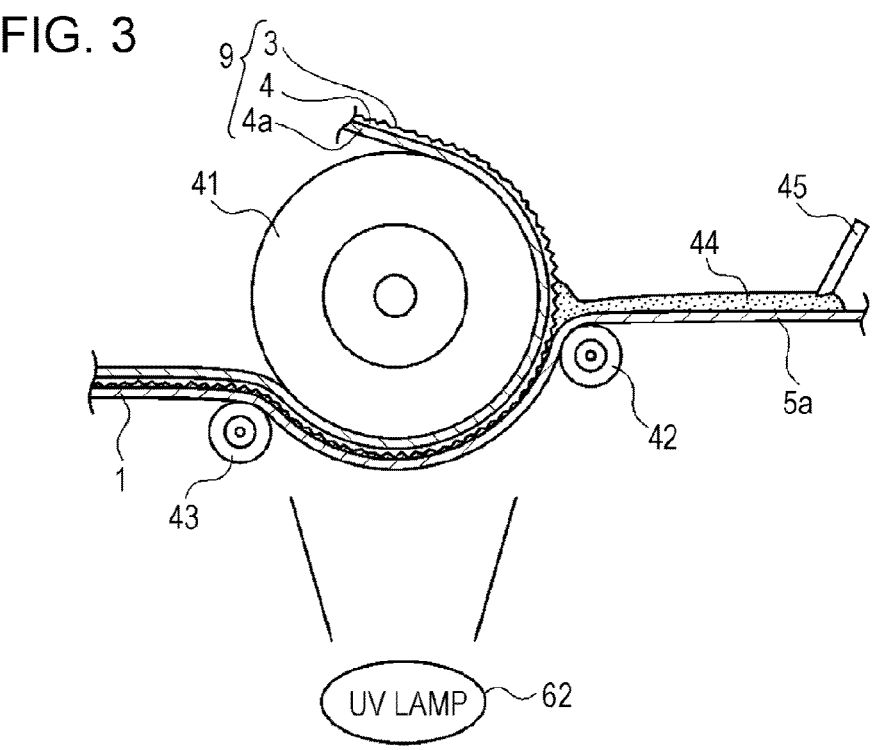
FIG. 3 is a schematic view illustrating one example of construction of an apparatus for manufacturing the optical film according to the first embodiment.

FIG. 3 is a schematic view illustrating one example of construction of an apparatus for manufacturing the optical film according to the first embodiment. As illustrated in FIG. 3, the manufacturing apparatus includes laminating rolls 41 and 42, a guide roll 43, a coating device 45, and an irradiation device 46.

The laminating rolls 41 and 42 are arranged to be able to nip a reflecting-layer affixed optical layer 9 and the second base 5a therebetween. The reflecting-layer affixed optical layer 9 is a layer obtained by forming the wavelength-selective reflecting layer 3 on one principal surface of the first optical layer 4. The reflecting-layer affixed optical layer 9 may further include the first base 4a disposed on the other principal surface of the first optical layer 4 on the opposite side to the one principal surface thereof on which the wavelength-selective reflecting layer 3 is formed. In the illustrated example, the wavelength-selective reflecting layer 3 is formed on the one principal surface of the first optical layer 4, and the first base 4a is disposed on the other principal surface of the first optical layer 4. The guide roll 43 is arranged in a conveying path within the manufacturing apparatus to be able to convey the optical film 1 having a belt-like shape. Materials of the laminating rolls 41 and 42 and the guide roll 43 are not limited to particular ones. A metal such as stainless steel, rubber, silicone, etc. can be optionally used, as appropriate, depending on the desired roll characteristics.

The coating device 45 can be prepared as a device including a coating unit, such as a coater. As the coater, ordinary coaters including a gravure coater, a wire bar, and a die can be optionally used, as appropriate, in consideration of physical properties of the resin composition to be coated, etc. The irradiation device 46 is a device for irradiating the resin composition with an ionizing ray, e.g., an electron ray, an ultraviolet ray, a visible ray, or a gamma ray. In the illustrated example, a UV lamp emitting an ultraviolet ray is used as the irradiation device 46.

Method of Manufacturing Master

A master 21 having a random fine concave-convex shape can be fabricated, for example, by using one of the following methods (1) to (9). Various types of masters 21 having different random fine concave-convex shapes are obtained by using the following methods (1) to (9).

(1) Method of Roughing Blank Surface

This is a method of roughing a smooth surface of a blank (parent material), which is used to fabricate a master and which is made of, e.g., glass, metal, ceramic or plastic, etc., by grinding with the aid of abrasive grains or sand blasting, or by etching. The pitch of concaves and convexes formed on the blank surface can be controlled depending on the size of the abrasive grains, the stroke and the force of the sand blasting, and/or the number of revolutions of the blank. The etching can also be used to control the degree of roughing and smoothing of the blank surface. Further, the concave-convex shape can be controlled, in the case of using the abrasive grains, by taking into consideration a locus along which the abrasive grains are swung, and in the case of the sand blasting or the etching, by taking into consideration an angle at which sands or an etchant is sprayed to the blank surface.

The sand blasting enables the optical film 1 to be fabricated with different diffusion angles in two directions orthogonal to each other in a plane or with anisotropy in diffusion characteristic in two directions orthogonal to each other in a plane. For example, a method disclosed in Japanese Unexamined Patent Application Publication No. 2005-250459 can be used as the method of fabricating the optical film 1 by the sand blasting.

(2) Method of Engraving Blank Surface

This is a method of engraving wax on the surface of a blank, which is used to fabricate the master, by using, e.g., a sharp-pointed needle (such as a diamond needle). Further, a metal may be deposited on the engraved surface of the master blank by vapor deposition, for example, thereby reinforcing the blank surface.

(3) Method of Aggregating Fine Solids onto Blank Surface from Gas or Liquid

This is, for example, a method of vapor-depositing fine solids on the surface of a blank, which is used to fabricate the master. Fine concaves and convexes can be formed on the surface of the master blank by carrying out the vapor deposition while selecting a condition under which the grain size is increased, such as setting the temperature of the blank to a lower level. Similarly, fine solids can be formed on the surface of the master blank by setting a condition in plating to reduce the amount of a stabilizer and other additives, which are usually added to a plating solution. Alternatively, fine solids may be aggregated on the surface of the master blank by spraying a solid solution or a dispersion liquid in the form of very fine mist to the surface of the master blank, or by guiding the master blank to pass through the very fine mist, thus causing the mist to adhere to the surface of the master blank, followed by evaporating a solvent or a dispersion medium.

(4) Method of Placing and Fixing Fine Particles Over Blank Surface

Fine particles are, e.g., powders, beads, sands, fine crystals, or microorganisms (such as funguses, viruses and planktons). The fine particles can be coated over the surface of a blank, which is used to fabricate the master, by applying the fine particles together with a high-polymeric binder. Also, the pitch, the height, etc. of surface concaves and convexes can be adjusted by variously changing, e.g., the size of the fine particles, a ratio of the fine particle to the binder, and/or the amount of fine particles applied. Further, when the microorganisms are used, fine concaves and convexes are formed by colonies that are generated when the microorganisms proliferate, and the colonies having various shapes are formed depending on the type of fungus, for example.

(5) Method of Utilizing Reticulations (Wrinkles) Generated in Coating Layer

This is a method of obtaining fine reticulations, i.e., fine concaves and convexes, on the surface of a blank, which is used to fabricate the master, through the steps of coating a paint, which is prepared, for example, by dissolving a high-polymeric coating material in an organic solvent, over the surface of the master blank, and then removing the solvent while controlling a drying condition to be held under a particular one. As another example, reticulations may be formed by causing a coated film to expand under heating or to absorb moisture under a properly controlled condition. As still another example, the fine concaves and convexes may be provided as reticulations that are generated, in a multilayer film, by using materials developing different mechanisms of chemical reactions in respective layers, and by controlling the coefficients of expansion and contraction of the respective layers.

(6) Method of Using Various Existing Materials

This is a method of utilizing paper, skins, cloth, ceramics, glass panes, wood plates, rock surfaces, and organisms, including not only insects, but also outer coats, scales, external skeletons and shells of fish, shellfish, etc., as they are.

(7) Method of Exposing and Developing Photopolymer

This is a method of utilizing a surface that is prepared by coating a photopolymer over the surface of a blank, which is used to fabricate the master, and by exposing and developing the coated photopolymer into an uneven pattern. The photopolymer can be exposed in the uneven pattern by utilizing a dot pattern for use in printing, or speckles generated with interference of coherent light (hereinafter referred to as a "laser interference method"). For example, a method disclosed in Japanese Patent No. 4460163 can be employed as the laser interference method.

(8) Method Utilizing Photolithography and Etching

This is a method of forming a random concave-convex shape on the surface of a blank, which is used to fabricate the master, by photolithography and etching.

(9) Combination of Foregoing Methods

This is a method of forming or selecting the surface having an irregular fine concave-convex shape that has been formed by any of the above-described methods (1) to (8), and then carrying out any of the above-described methods (1) to (8) again on the relevant surface.

Method of Manufacturing Optical Film

One example of a method of manufacturing the optical film according to the first embodiment will be described below with reference to FIGS. 4A to 8C. Note that, in consideration of productivity, part or the whole of a manufacturing process described below is preferably performed in a roll-to-roll manner except for a step of fabricating the master.

Step of Fabricating Master

Figure 4A:
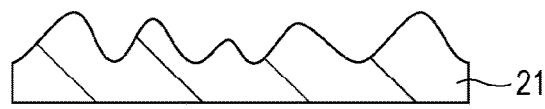
FIGS. 4A to 4C illustrate successive steps to explain one example of a method of manufacturing the optical film according to the first embodiment.

First, as illustrated in FIG. 4A, a master 21 having a random fine concave-convex shape is fabricated. The master 21 may be in the form of, e.g., a flat plate, a circular column, or a circular cylinder. The fine concave-convex shape can be formed on the master surface by using any of the above-described methods (1) to (9), or any combination of two or more of those methods. Among those methods, the sand blasting method, the laser interference method, or the method utilizing photolithography and etching is preferably used.

Two or more of those methods may be used in a combined manner. The sand blasting method and the method utilizing photolithography and etching are described below as preferred examples.

Sand Blasting Method

Figure 5A:
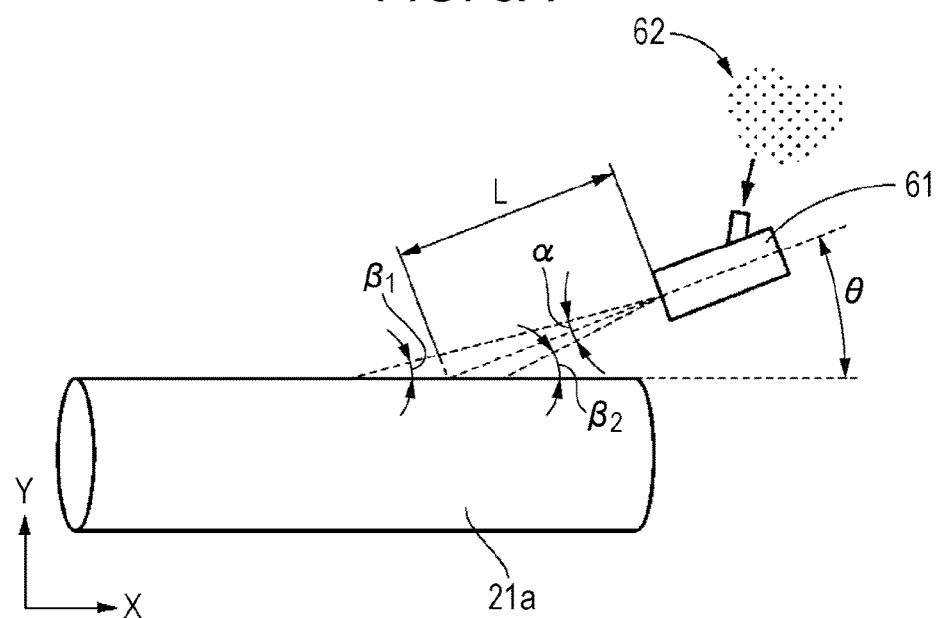
FIGS. 5A and 5B are illustrations to explain one example of a method of processing the master surface by sand blasting.
Figure 5B:
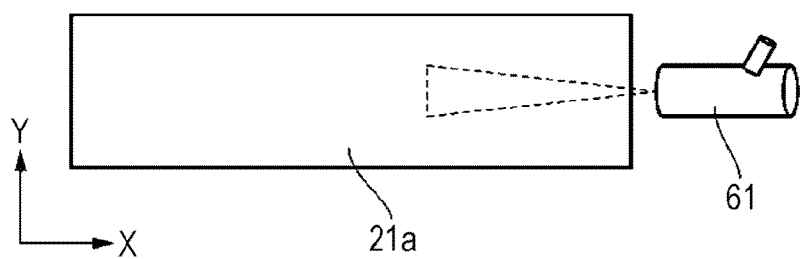

FIGS. 5A and 5B are illustrations to explain one example of a method of processing the master surface by sand blasting.

In the sand blasting, concaves and convexes are formed on the surface of a master blank 21a by ejecting abrasives 62 from a blasting gun 61 of a sand blasting apparatus (not shown) such that the abrasives 62 are sprayed to be impinged against the surface of the master blank 21a.

The sand blasting apparatus is an apparatus for ejecting the abrasives 62 with pressurized gas, e.g., air or nitrogen, from the blasting gun 61 and spraying the abrasives 62 to the master blank 21a as a workpiece, thereby processing the surface of the master blank 21a. In the illustrated example, the sand blasting is carried out under a predetermined condition, described below, while the master blank 21a is rotated.

The abrasives 62 are preferably grains, which are made of, e.g., resin, glass, metal or ceramic, and which have a spherical or angled (e.g., polygonal) shape. In particular, angled grains are preferable. Examples of the grains include glass beads, zirconia grains, steel grids, alumina grains, and silica grains. The mean size of the abrasives 62 is preferably 1 to 1000 µm, more preferably 5 to 600 µm, and even more preferably 5 to 50 µm. Further, the weight of one grain of the abrasives 62 is preferably 0.002 to 8 mg.

The master blank 21a is made of a material suitable for carrying out the sand blasting. That material is preferably a resin or a metal, such as aluminum, copper or steel. In particular, aluminum is preferable. The size of the master blank 21a is set to have a width adaptable for that of the optical film 1 having, e.g., a belt-like shape.

A spraying condition for the abrasives 62 is preferably set such that, in FIG. 5A, an angle (angle of declination) at which the abrasives 62 are sprayed to a principal surface of the master blank 21a is smaller than 90° at all points. In more detail, an angle θ formed between a principal axis of the master blank 21a and the blasting gun 61 is preferably 0 to 60°, more preferably 0 to 20°, and even more preferably of 0 to 10°.

In the illustrated example, by spraying the abrasives 62 at the angle θ of 10°, the pitch of grooves can be made different between a spraying direction of the abrasives 62 and a direction perpendicular to the spraying direction. Further, a profile of surface roughness in the spraying direction can be made asymmetrical with respect to the principal axis (i.e., a normal line to the principal surface) of a light diffusion sheet.

The abrasives 62 having impinged against the master blank 21a cut or deform the surface of the master blank 21a while loosing their energy, and then scatter upward of the master blank 21a at a certain angle. By setting the above-described spraying condition, because the abrasives 62 impinge against the master blank 21a at a specific angle, the blank surface is deformed by the impingement of the abrasives 62 in different ways between the transverse direction (X-axis direction) and the longitudinal direction (Y-axis direction). Under the condition illustrated in FIGS. 5A and 5B, for example, a deformed shape (recess) has a longer size in the X-axis direction than in the Y-axis direction. In other words, surface roughness in the X-axis direction has a larger pitch than that in the Y-axis direction. The pitch and other parameters of the surface roughness can be adjusted depending on various parameters of the master blank 21a, the abrasives 62, and the sand blasting conditions (such as the conditions in spraying the abrasives 62). For example, when the abrasives having a larger size are used, the pitch of the surface roughness is increased in both the X-axis direction and the Y-axis direction. Also, when the abrasives having a larger density are used, grooves having deeper shapes can be realized.

The shape of the master blank 21a after the sand blasting in the ejecting direction of the abrasives 62 can be controlled depending on the pressure of pressurized air in the blasting gun 61, which determines energy of the abrasives 62 at the time when the abrasives 62 are ejected, the angle of the blasting gun 61, the distance between the blasting gun 61 and the master blank 21a, the shape, density and hardness of the abrasives 62, the material quality of the master blank 21a, etc. The shape of the master blank 21a after the sand blasting in a direction perpendicular to the ejecting direction of the abrasives 62 can be controlled depending on the shape and hardness of the abrasives 62. Further, because the locus along which the abrasives 62 deform the master blank 21a while loosing energy and the locus along which the abrasives 62 are scattered from the master blank 21a by the action of repulsive forces are not symmetrical, the master blank 21a can be sand-blasted to have a surface shape that is asymmetrical with respect to the principal axis of the master blank 21a.

By employing the master that has been fabricated under the above-described spraying conditions, the optical film 1 can be fabricated such that it has different diffusion angles between the longitudinal direction and the transverse direction thereof, or that it has anisotropy in diffusion characteristic between the longitudinal direction and the transverse direction thereof. Under the spraying condition for the abrasives 62 as illustrated in FIGS. 5A and 5B, for example, a diffusion angle of light reflected by or passing through the master blank 21a is relatively narrow in the X-direction and is relatively wide in the Y-direction, and a brightness peak in diffusion characteristic is shifted toward the X1 side in the X-direction.

Stated another way, in addition to that a diffusion angle of light reflected by or passing through the master blank 21a is relatively narrow in the X-direction and is relatively wide in the Y-direction, when angle dependency of the brightness of light diffused by a diffusion surface after having being emitted to enter that diffusion surface at an incident angle of 0° is measured, an axis of maximum brightness is inclined toward the X1 side with respect to the normal direction to the principal surface of the light diffusion sheet, and a brightness distribution is asymmetrical with respect to the axis of maximum brightness.

Further, as the blasting gun 61 is arranged in a posture lying more horizontally relative to the master blank 21a, namely, as the angle θ is set to a smaller value, it is possible to increase a later-described lengthwise to widthwise ratio of the diffusion angle of the light diffusion sheet, and to provide a higher effect that is obtained with anisotropy of the diffusion characteristic.

The abrasives 62 are ejected from the blasting gun 61 at an angle θ between its center axis and the master blank 21a with an angle width α about the center axis. In other words, the abrasives 62 enter and impinge against the master blank 21a within an angle range of β1 to β2. The angle width α is usually about 10°.

When sand-blasting the master blank 21a in a smaller area, the angle width α is set to a smaller value, or the distance L between the blasting gun 61 and the master blank 21a is set to a smaller value. When sand-blasting the master blank 21a in a larger area, the blasting gun 61 or the master blank 21a is smoothly moved while the sand blasting is continued.

In the illustrated example, while continuously ejecting the abrasives 62 from the blasting gun 61, the blasting gun 61 is scanned over the master blank 21a such that the principal surface of the master blank 21a is entirely sand-blasted.

Method of Processing Master Surface by Photolithography and Etching

FIGS. 6A to 6E illustrate successive steps to explain one example of a method of processing the master surface by photolithography and etching.

Resist Layer Forming Step

Figure 6A:
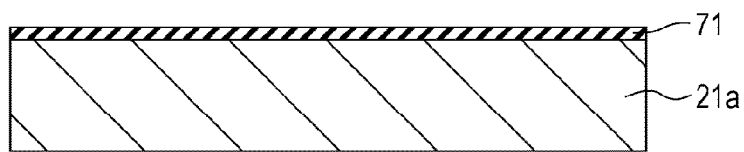
FIGS. 6A to 6E illustrate successive steps to explain one example of a method of processing the master surface by photolithography and etching.

First, a resist layer 71 is formed on the surface of the master blank 21a, i.e., a workpiece, (see FIG. 6A). The master blank 21a, i.e., a workpiece, may be in the form of, e.g., a plate, a sheet, a film, a block, a circular column, a circular cylinder, or a circular ring. The resist layer 71 can be made, for example, of an inorganic resist or an organic resist. When the master blank 21a is in the form of a circular column or cylinder, the resist layer 71 is preferably formed on the outer circumferential surface of the circular column or cylinder.

Exposure Step

Figure 6B:
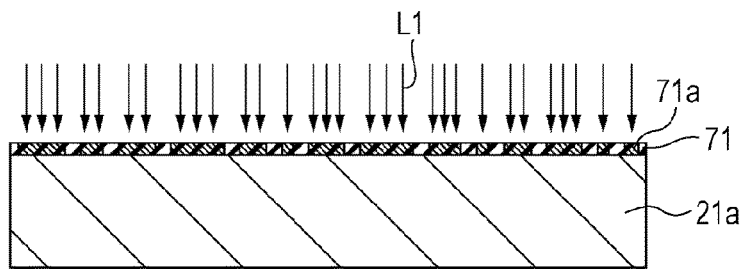

Next, the resist layer 71 is illuminated with light L1, such as a laser beam, to form exposed portions 71a in the resist layer 71 at random (see FIG. 6B). The exposed portions 71a formed in the resist layer 71 may have, e.g., a circular or substantially circular shape.

Developing Step

Figure 6C:
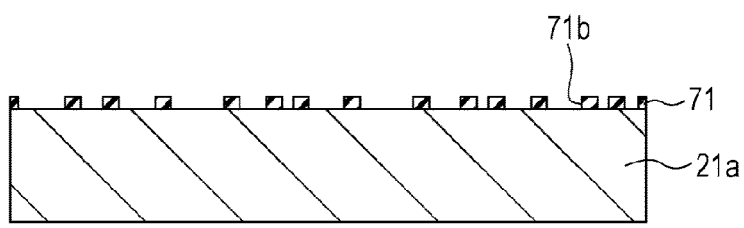
Figure 6D:
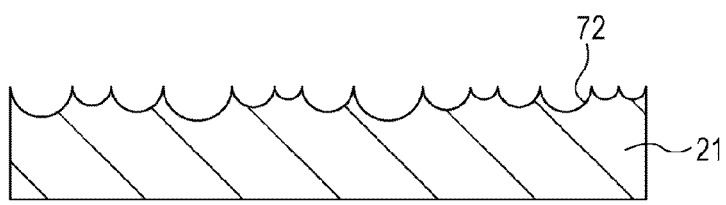

Next, the resist layer 71 including the exposed portions 71a formed therein is developed. As a result, openings 71b corresponding to the exposed portions 71a are formed in the resist layer 71 (see FIG. 6C). The openings 71b preferably have circular shapes differing in radius. Although FIG. 6C illustrates an example in which the openings 71b are formed in the exposed portions 71a by using a positive type resist as the resist layer 71, the resist usable here is not limited to the positive type. In other words, the exposed portions may be left by using a negative type resist as the resist layer 71.

Etching Step

Next, the surface of the master blank 21a is etched by using, as a mask, the resist layer 71 including the openings 71b formed therein. As a result, recesses 72 having different depths and/or different radii are formed in the surface of the master blank 21a (see FIG. 6D). Each of the recesses 72 preferably has a partially spherical shape. The term "partially spherical shape" implies a shape that is obtained by cutting part of a spherical shape or a substantially spherical shape. The etching can be practiced, for example, as dry etching or wet etching. From the viewpoint of simplicity in equipment, the wet etching is more preferable. Further, the etching can be practiced, for example, as isotropic etching or anisotropic etching. The isotropic or anisotropic etching is preferably selected, as appropriate, depending on the desired random concave-convex shape.

Resist Peeling-Off Step

Next, the resist layer 71 formed on the surface of the master blank 21a is peeled off, when necessary, by ashing, for example.

Plating Step

Next, the concave-convex surface of the master 21 may be subjected to plating, when necessary, to form a plated layer such as a nickel-plated layer.

The master 21 having the random concave-convex shape is obtained with the above-described steps.

Transfer Step

Figure 4B:
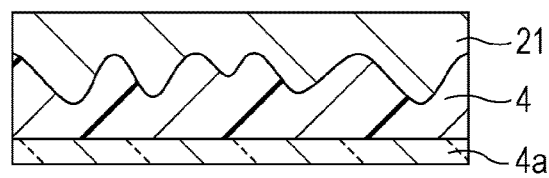
Figure 6E:

Next, as illustrated in FIGS. 4B and 6E, the random concave-convex shape of the master 21 is transferred to a resin material in the form of a film by, e.g., the hot extrusion method or the transfer method. The transfer method can be practiced, for example, by a process of pouring an energy-ray curable resin into a mold and irradiating the resin with an energy ray to cure it, or a process of applying heat or pressure to a curable resin, or a process of supplying a resin film from a stock roll and transferring the shape of a die to the resin film while applying heat (called a laminating transfer method). As a result, the first optical layer 4 having the random concave-convex surface on one principal surface thereof is formed as illustrated in FIG. 4C.

Figure 4C:
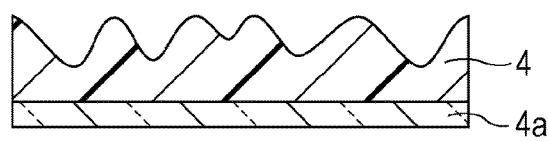

Further, as illustrated in FIG. 4C, the first optical layer 4 may be formed on the first base 4a. This case can be practiced, for example, by a process of supplying the first base 4a in the form of film from a stock roll, coating an energy-ray curable resin on the first base 4a, pressing the resin against a die to transfer the shape of the die to the resin, and irradiating the resin with an energy ray to cure it. Preferably, the resin further contains a cross-linking agent. The reason is that the cross-linking makes the resin heat-resistant without changing the storage modulus at the room temperature to a large extent.

Film Forming Step

Figure 7A:
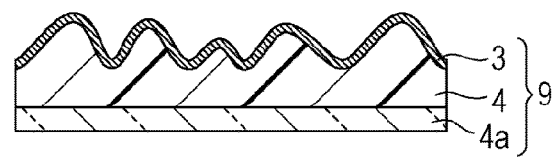
FIGS. 7A to 7C illustrate successive steps to explain one example of a method of manufacturing the optical film according to the first embodiment.
Figure 7B:
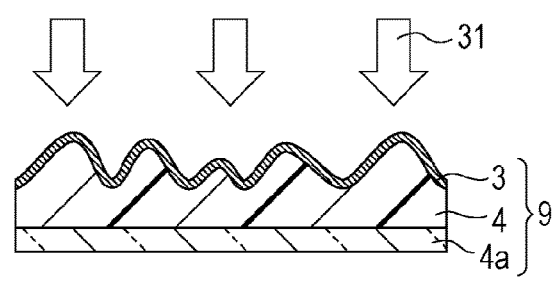

Next, as illustrated in FIG. 7A, the wavelength-selective reflecting layer 3 is formed on the one principal surface of the first optical layer 4. The wavelength-selective reflecting layer 3 can be formed, for example, by sputtering, evaporation, CVD (Chemical Vapor Deposition), dip coating, die coating, wet coating, and spray coating. Next, as illustrated in FIG. 7B, the wavelength-selective reflecting layer 3 is subjected to annealing as indicated by 31, when necessary. The temperature of the annealing is in the range of, e.g., 100° C. or higher to 250° C. or lower.

Embedding Step

Figure 7C:
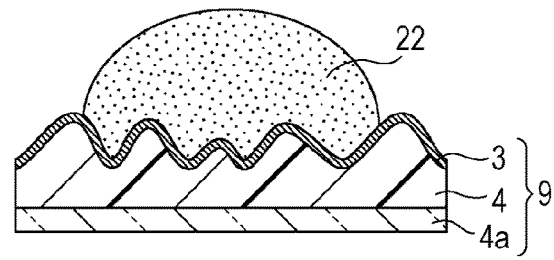
Figure 8A:
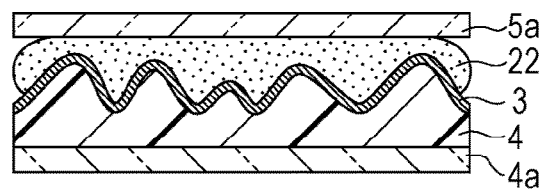
FIGS. 8A to 8C illustrate successive steps to explain one example of the method of manufacturing the optical film according to the first embodiment.
Figure 8B:
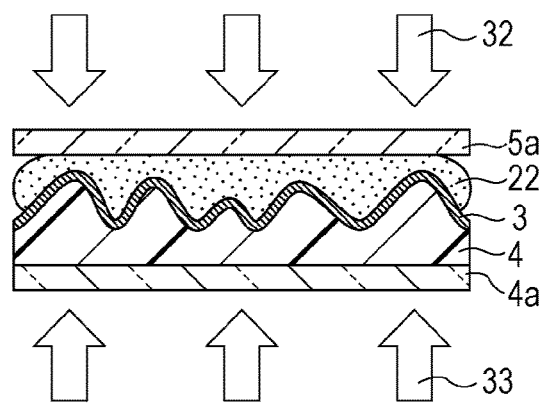
Figure 8C:
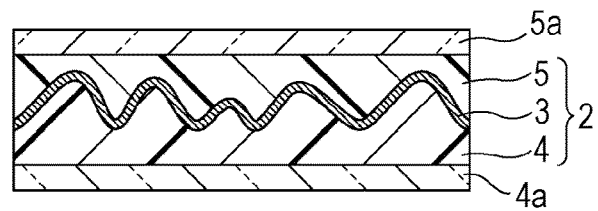

Next, as illustrated in FIG. 7C, a resin 22 in a not-yet-cured state is coated over the wavelength-selective reflecting layer 3. The resin 22 may be, e.g., an energy-ray curable resin or a thermosetting resin. The energy-ray curable resin used here is preferably an ultraviolet-ray curable resin. Next, as illustrated in FIG. 8A, a laminate is formed by placing the second base 5a over the resin 22. Next, as illustrated in FIG. 8B, the resin 22 is cured by applying, e.g., an energy ray or heat as indicated by 32, while pressure is applied to the laminate as indicated by 33. Examples of the energy ray usable here include an electron ray, an ultraviolet ray, a visible ray, and a gamma ray. The ultraviolet ray is more preferable from the viewpoint of production equipment. Preferably, an integrated irradiation amount is selected, as appropriate, in consideration of the curing characteristic of the resin, suppression of yellowing of the resin and the second base 5a, etc. The pressure applied to the laminate is preferably in the range of 0.01 MPa or higher to 1 MPa or lower. If the applied pressure is lower than 0.01 MPa, a problem may occur in traveling of the film. On the other hand, if the applied pressure exceeds 1 MPa, a metal roll is to be used as the nip roll, and the applied pressure is more apt to fluctuate. Through the above-described steps, as illustrated in FIG. 8C, the second optical layer 5 is formed on the wavelength-selective reflecting layer 3 and the optical film 1 is obtained.

A method of forming the optical film 1 by using the manufacturing apparatus, illustrated in FIG. 3, will be described in more detail below. First, the second base 5a is let out from a base supply roll (not shown), and the let-out second base 5a is guided to pass under the coating device 45. Next, an ionizing-ray curable resin 44 is coated by the coating device 45 on the second base 5a passing under the coating device 45. Next, the second base 5a coated with the ionizing-ray curable resin 44 is conveyed toward the laminating rolls 41 and 42. On the other hand, the reflecting-layer affixed optical layer 9 is let out from an optical layer supply roll (not shown) and is conveyed toward the laminating rolls 41 and 42.

Next, the second base 5a and the reflecting-layer affixed optical layer 9, each having been conveyed in such a way, are sandwiched between the laminating rolls 41 and 42 without allowing bubbles to enter between the second base 5a and the reflecting-layer affixed optical layer 9, whereby the reflecting-layer affixed optical layer 9 is laminated on the second base 5a. Next, the second base 5a including the laminated reflecting-layer affixed optical layer 9 is conveyed along an outer circumferential surface of the laminating roll 41 while the irradiation device 46 irradiates the ionizing-ray curable resin 44 with the ionizing ray from the side including the second base 5a, thereby curing the ionizing-ray curable resin 44. As a result, the second base 5a and the reflecting-layer affixed optical layer 9 are affixed to each other with the ionizing-ray curable resin 44 interposed therebetween, and the objective optical film 1 having a long size is fabricated. Next, the fabricated belt-shaped optical film 1 is taken up by a take-up roll (not shown). Eventually, a stock roll in the rolled form of the belt-shaped optical film 1 is obtained.

Given that the process temperature in the above-described process of forming the second optical layer 5 is t° C., the first optical layer 4 in the cured state preferably has the storage modulus of $3 \times 10^7$ Pa or more at $(t-20)°$ C. Herein, the process temperature t is, for example, the heating temperature of the laminating roll 41. The first optical layer 4 is conveyed, for example, in such a state that the first optical layer 4 is formed on the first base 4a and is conveyed along the laminating roll 41 with the first base 4a interposed therebetween. It is, therefore, empirically confirmed that the actual temperature of the first optical layer 4 is about $(t-20)°$ C. Accordingly, by setting the storage modulus of the first optical layer 4 to be $3 \times 10^7$ Pa or more at $(t-20)°$ C., the random concave-convex shape of the interface inside the optical layer can be prevented from deforming due to application of heat or both of heat and pressure.

Further, the first optical layer 4 preferably has the storage modulus of $3 \times 10^9$ Pa or less at 25° C. With such a property, the optical film 1 can be given with flexibility at the room temperature. Hence, the optical film 1 can be fabricated, for example, by using the roll-to-roll manufacturing process.

In consideration of the heat resistance of the resin used as the optical layer or the base, the process temperature t is preferably 200° C. or lower. However, when a resin having higher heat resistance is used, the process temperature t can be set to 200° C. or higher.

According to the first embodiment, since the optical film includes the diffusely reflecting surface having the random concave-convex shape, the generation of the diffraction pattern can be suppressed. Also, since the master 21 having the random concave-convex surface is fabricated by, e.g., the sand blasting method, the laser interference method, or the method utilizing photolithography and etching, the number of days necessary for processing to fabricate the master can be greatly reduced.

In contrast, when a roll-shaped master having a width of 100 cm or larger and a diameter of 20 cm or larger, for example, is fabricated in a regular concave-convex shape as per design for the purpose of controlling the direction of light reflected by an optical film, a lot of time and cost are taken. Another problem is that, if any trouble such as an earthquake occurs during the processing time, the master becomes unusable.

Further, according to the first embodiment, since the wavelength-selective reflecting layer 3 as a partially reflecting layer is formed on the diffusely reflecting surface to which the random concave-convex shape of the master has been transferred, part of the sunlight can be reflected upward to the sky.

Moreover, since the random concave-convex shape of the first optical layer 4 is embedded with the second optical layer 5 having substantially the same refractive index as that of the first optical layer 4 and the second optical layer 5 has the smooth surface, it is also possible to clearly view a transmission image.

2. Second Embodiment

Figure 9A:
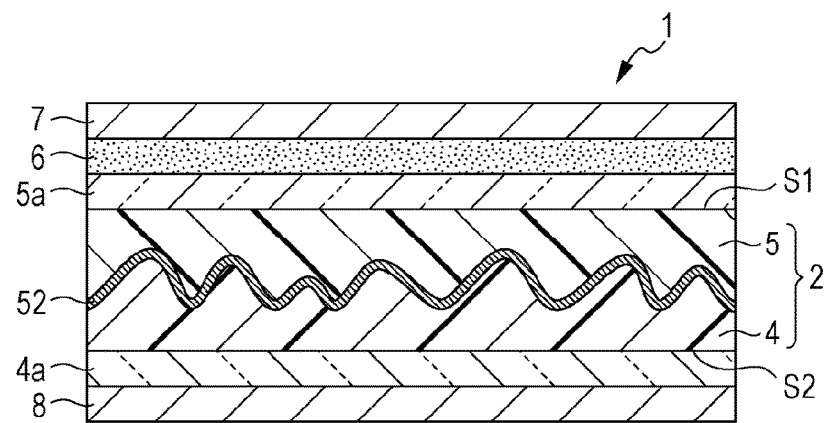
FIG. 9A is a sectional view illustrating one example of structure of an optical film according to a second embodiment.

FIG. 9A is a sectional view illustrating one example of structure of an optical film 1 according to a second embodiment. In the second embodiment, the same or corresponding components as or to those in the first embodiment are denoted by the same symbols, and description of those components are omitted. The optical film 1 according to the second embodiment differs from the optical film according to the first embodiment in that the former is a semi-transmissive optical film having diffuse reflective power and it includes a semi-transmissive layer 52 as a partially reflecting layer. The semi-transmissive optical film having diffuse reflective power diffusely reflects part of incident light, but it transmits the remaining part of the incident light therethrough.

Figure 9B:
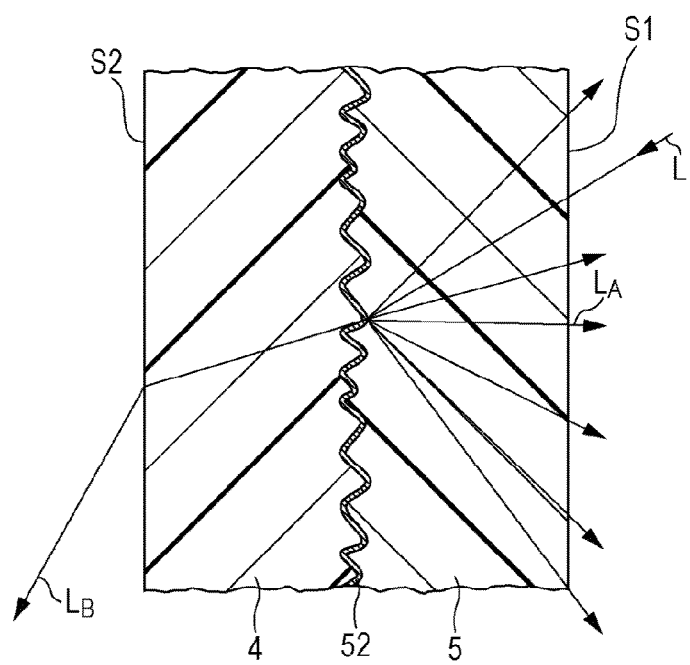
FIG. 9B is an enlarged sectional view to explain the function of the optical film according to the second embodiment.

FIG. 9B is an enlarged sectional view to explain the function of the optical film according to the second embodiment. The optical film 1 has an incident surface S1 on which light L is incident. The optical film 1 diffusely reflects light $L_A$, which is part of the light L entering the incident surface S1, while transmitting the remaining light $L_B$ therethrough. The diffusely reflected light is preferably light primarily falling within the wavelength band of 400 nm or longer to 2100 nm or shorter.

The semi-transmissive layer 52 serving as the partially reflecting layer is a semi-transmissive reflecting layer that cuts off, for example, not only infrared light, but also visible light at the same time. Thus, the semi-transmissive reflecting layer has semi-transmissivity in, e.g., the visible range and the near infrared range. The semi-transmissive reflecting layer may be, for example, a thin metal layer or metal nitride layer containing a semiconductive material. From the viewpoint of improving anti-reflection property, color tone adjustment, chemical wetting, reliability against environmental degradation, etc., the semi-transmissive reflecting layer is preferably formed in a multilayer structure stacked with, e.g., an oxide layer, a nitride layer, or an oxynitride layer.

The metal layer having a high reflectance in the visible range and the infrared range can be made of materials containing, as a main component, Au, Ag, Cu, Al, Ni, Cr, Ti, Pd, Co, Si, Ta, W, Mo or Ge alone, or an alloy containing two or more selected from among those elements, for example. Of those examples, Ag-, Cu-, Al-, Si- or Ge-based materials are preferable in consideration of practicability. To retard corrosion of the metal layer, an additional material, such as Ti or Nd, is preferably mixed in the metal layer. The metal nitride layer can be made of, e.g., TiN, CrN, or WN.

The mean film thickness of the semi-transmissive layer 52 can be set, for example, in the range of 2 nm or more to 40 nm or less. However, the film thickness of the semi-transmissive layer 52 is not limited to such a range so long as the semi-transmissive layer 52 has semi-transmissivity in the visible range and the near infrared range. Herein, the term "semi-transmissivity" implies that the transmittance at wavelengths of 500 nm or longer and 1000 nm or shorter is preferably 5% or more and 70% or less, more preferably 10% or more and 60% or less, and even more preferably 15% or more and 55% or less. Also, the term "semi-transmissive layer" implies that the transmittance at wavelengths of 500 nm or longer and 1000 nm or shorter is preferably 5% or more and 70% or less, more preferably 10% or more and 60% or less, and even more preferably 15% or more and 55% or less.

3. Third Embodiment

In a third embodiment, the same or corresponding components as or to those in the first embodiment are denoted by the same symbols, and description of those components are omitted. An optical film 1 according to the third embodiment differs from the optical film according to the first embodiment in that the former diffusely reflects light in a specific wavelength band, but it scatters light other than the specific wavelength band. The optical film 1 according to the third embodiment includes a light scatterer for scattering the incident light. The light scatterer is disposed, for example, in at least one of positions on the surface of the optical layer 2, inside the optical layer 2, and between the wavelength-selective reflecting layer 3 and the optical layer 2. Preferably, the light scatterer is disposed in at least one of positions between the wavelength-selective reflecting layer 3 and the first optical layer 4, inside the first optical layer 4, and on the surface of the first optical layer 4. When the optical film 1 is affixed to a support such as a window member, it can be affixed to either the indoor side or the outdoor side of the support. When the optical film 1 is affixed to the outdoor side, the light scatterer for scattering the light other than the specific wavelength band is preferably disposed only between the wavelength-selective reflecting layer 3 and the support such as the window member. The reason is that if the light scatterer is present between the wavelength-selective reflecting layer 3 and the incident surface, the diffuse reflection characteristic is lost. Also, when the optical film 1 is affixed to the indoor side, the light scatterer is preferably disposed between the emergent surface on the side opposite to the affixed surface of the optical film 1 and the wavelength-selective reflecting layer 3.

Figure 10A:
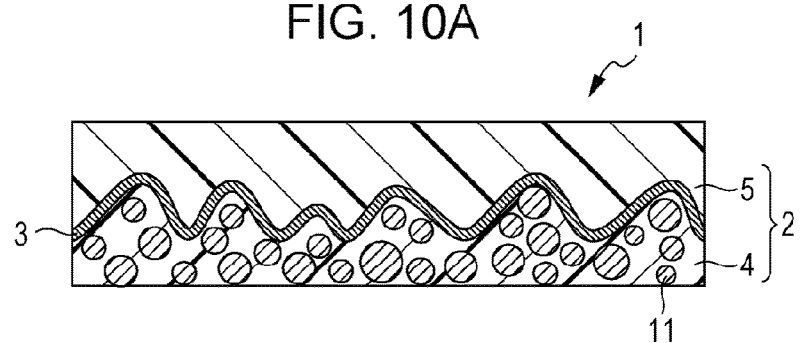
FIGS. 10A to 10C are each a sectional view illustrating one example of structure of an optical film according to a third embodiment.

FIG. 10A is a sectional view illustrating a first example of structure of the optical film 1 according to the third embodiment. As illustrated in FIG. 10A, the first optical layer 4 includes a resin and fine particles 11. The fine particles 11 have a refractive index differing from that of the resin, which is a main component material of the first optical layer 4. For example, at least one kind of organic fine particles and inorganic fine particles can be used as the fine particles 11. The fine particles 11 may be hollow fine particles. Examples of the fine particles 11 include inorganic fine particles made of, e.g., silica or alumina, and organic fine particles made of, e.g., styrene, acryl, or a copolymer of the formers. Among those examples, silica fine particles are particularly preferable.

Figure 10B:
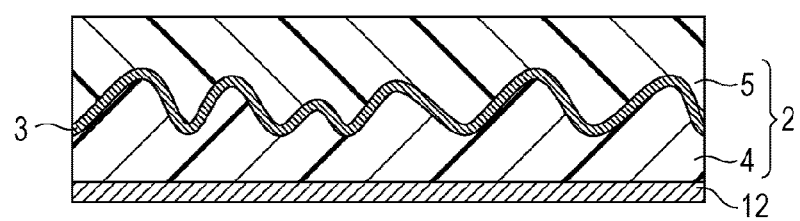

FIG. 10B is a sectional view illustrating a second example of structure of the optical film 1 according to the third embodiment. As illustrated in FIG. 10B, the optical film 1 further includes a light diffusion layer 12 on the surface of the first optical layer 4. The light diffusion layer 12 includes, for example, a resin and fine particles. The fine particles can be made of the same materials as those used in the above-described first example.

Figure 10C:
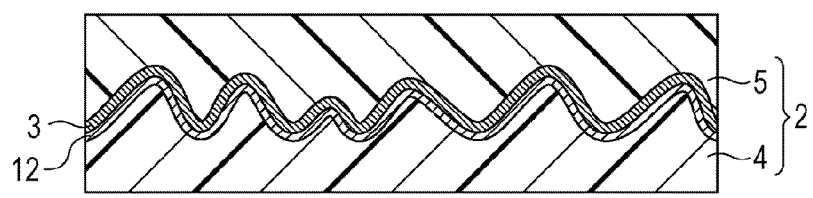

FIG. 10C is a sectional view illustrating a third example of structure of the optical film 1 according to the third embodiment. As illustrated in FIG. 10C, the optical film 1 further includes a light diffusion layer 12 between the wavelength-selective reflecting layer 3 and the first optical layer 4. The light diffusion layer 12 includes, for example, a resin and fine particles. The fine particles can be made of the same materials as those used in the above-described first example.

According to the third embodiment, it is possible to diffusely reflect the light in the specific wavelength band, e.g., an infrared ray, and to scatter the light other than the specific wavelength band, e.g., visible light. Hence, a visually attractive design can be given to the optical film 1 by making the optical film 1 clouded.

4. Fourth Embodiment

Figure 11:
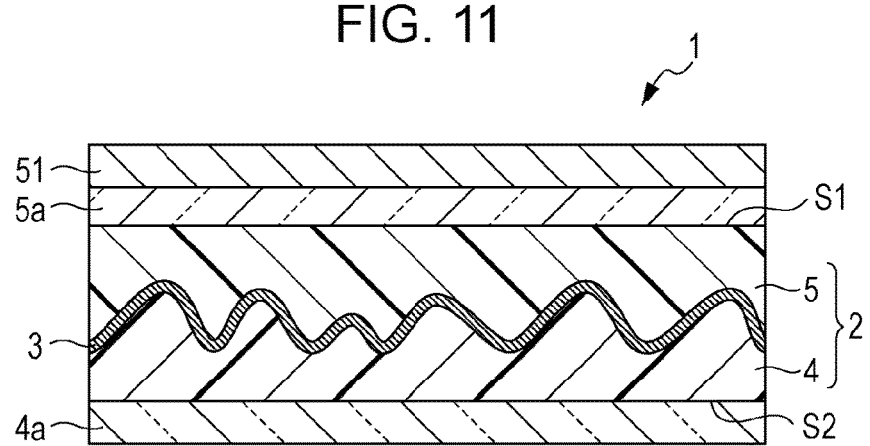
FIG. 11 is a sectional view illustrating one example of structure of an optical film according to a fourth embodiment.

FIG. 11 is a sectional view illustrating one example of structure of an optical film according to a fourth embodiment. In the fourth embodiment, the same or corresponding components as or to those in the first embodiment are denoted by the same symbols, and description of those components are omitted here. The fourth embodiment differs from the first embodiment in that the former further includes a self-cleaning effect layer 51, which develops a cleaning effect in itself, on an exposed surface of the optical film 1 on the side oppositely away from one of the incident surface S1 and the emergent surface S2 thereof, which is affixed to the adherend. The self-cleaning effect layer 51 includes, for example, a photocatalyst. For example, $TiO_2$ can be used as the photocatalyst.

As described above, the optical film 1 is featured in transmitting part of the incident light therethrough. When the optical film 1 is used outdoors or in a dirty room, for example, light is scattered due to dirt and dust adhering to the surface of the optical film 1, whereby transmissivity and reflectivity are lost. Therefore, the surface of the optical film 1 is preferably optically transparent at all times. In other words, it is preferable that the surface of the optical film 1 is superior in the water-repellent or hydrophilic property and it can automatically develop the self-cleaning effect.

According to the fourth embodiment, since the optical film 1 includes the self-cleaning effect layer 51, the water-repellent or hydrophilic property, etc. can be given to the incident surface. Hence, it is possible to suppress dirt and dust from adhering to the incident surface and to suppress degradation of the diffuse reflection characteristic.

5. Fifth Embodiment

Figure 12:
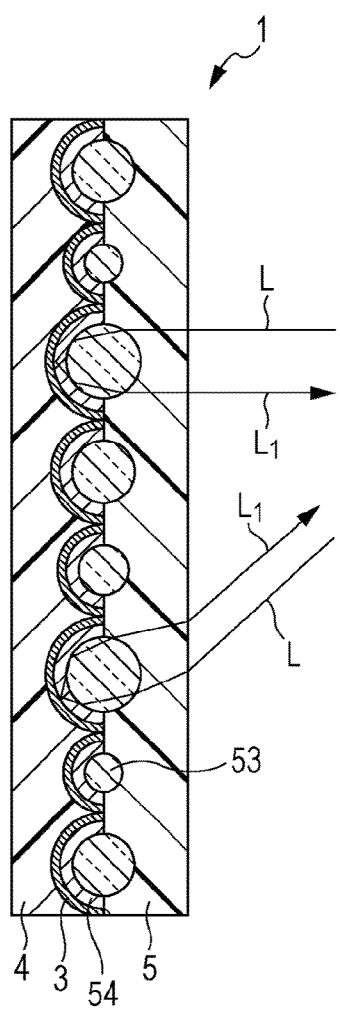
FIG. 12 is a sectional view illustrating one example of structure of an optical film according to a fifth embodiment.

FIG. 12 is a sectional view illustrating one example of structure of an optical film according to a fifth embodiment. In the fifth embodiment, the same or corresponding components as or to those in the first embodiment are denoted by the same symbols. The fifth embodiment differs from the first embodiment in that, as illustrated in FIG. 12, the random concave-convex shape of the first optical layer 4 is formed by using beads 53.

Many beads 53 are buried in one principal surface of the second optical layer 5 such that the beads are partly projected from the one principal surface. Further, a focal point layer 54, the wavelength-selective reflecting layer 3, and the first optical layer 4 are successively stacked on the one principal surface of the second optical layer 5 in which the beads 53 are buried. The beads 53 have a spherical shape, for example. The beads 53 preferably have transparency. The beads 53 are made of an inorganic material, e.g., glass, or an organic material, e.g., a high-polymeric resin, as a primary component.

It is preferable that the beads 53 are projected from the second optical layer 5 in different amounts, and/or that the beads 53 have different sizes. As a result, the shape of the wavelength-selective reflecting layer 3 on the first optical layer 4 can be changed at random.

6. Sixth Embodiment

While the first embodiment has been described above, by way of example, in connection with case of applying the present technology to the window member, embodiments of the present technology are not limited to the above-described application and can be further applied to various interior and exterior members, etc. other than the window member. Stated another way, the optical film according to the embodiment of the present technology is applicable to not only fixedly installed interior and exterior members, such as walls and roofs, but also to a device capable of adjusting an amount of the transmitted and/or reflected sunlight by moving an interior or external member depending on changes in amount of the sunlight, which are caused with the shift of seasons and the elapse of time, etc., and taking the adjusted amount of the sunlight into an indoor space, etc. In a sixth embodiment, one example of such a device is described in connection with a solar shading device (in the form of a window blind or a shade) capable of adjusting a degree at which a group of many solar shading members cuts off the incident light, by changing an angle of the solar shading member group.

Figure 13:
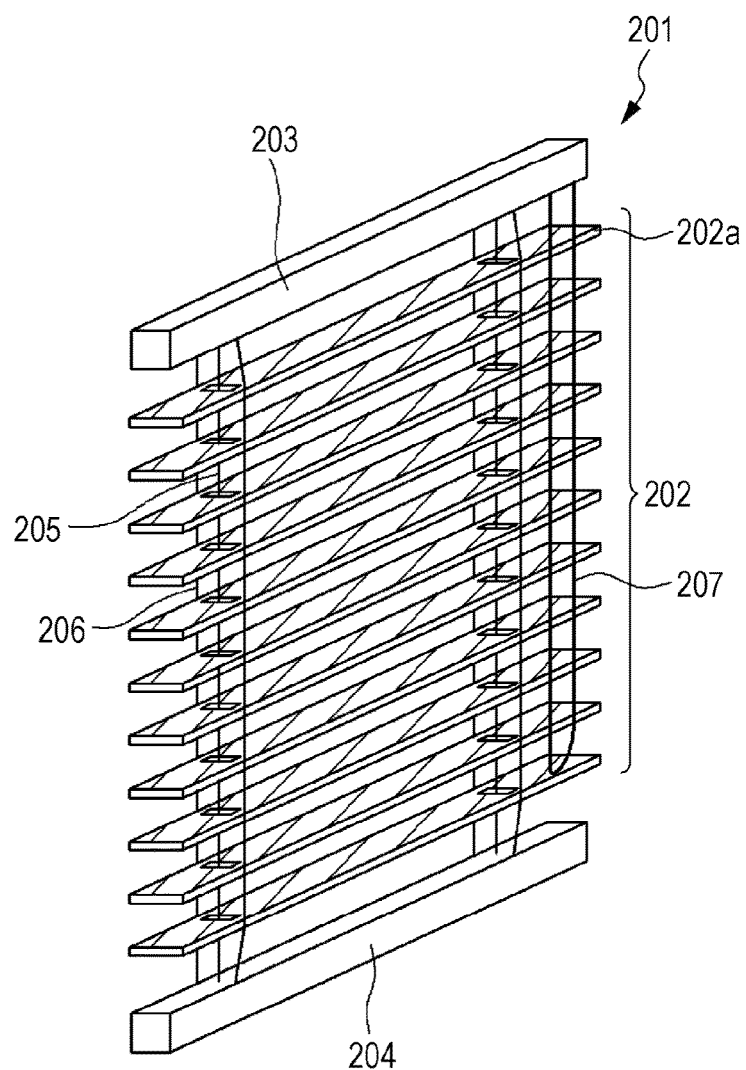
FIG. 13 is a perspective view illustrating one example of structure of a window blind (shade) according to a sixth embodiment.

FIG. 13 is a perspective view illustrating one example of structure of a window blind (shade) 201 according to the sixth embodiment. As illustrated in FIG. 13, the window blind 201 as one example of the solar shading device includes a head box 203, a slat group (solar shading member group) 202 made up of plural slats (blades) 202a, and a bottom rail 204. The head box 203 is disposed above the slat group 202 made up of the plural slats 202a. Ladder chords 206 and rise-and-fall chords 205 are extended downward from the head box 203, and the bottom rail 204 is suspended at lower ends of those chords. The slats 202a serving as the solar shading members are each formed in a slender rectangular shape, for example, and are supported by the ladder chords 206, which are extended downward from the head box 203, at predetermined intervals in a suspended state. Further, the head box 203 is provided with an operating member (not shown), such as a rod, for adjusting an angle of the slat group 202 made up of the plural slats 202a.

The head box 203 serves as a driving unit for rotating the slat group 202 made up of the plural slats 202a in accordance with operation of the operating member, such as the rod, thereby adjusting the amount of light taken into an indoor space, for example. Further, the head box 203 has the function of a driving unit (raising and lowering unit) for raising and lowering the slat group 202, as appropriate, in accordance with operation of an operating member, e.g., a rise-and-fall operating chord 207.

Figure 14A:
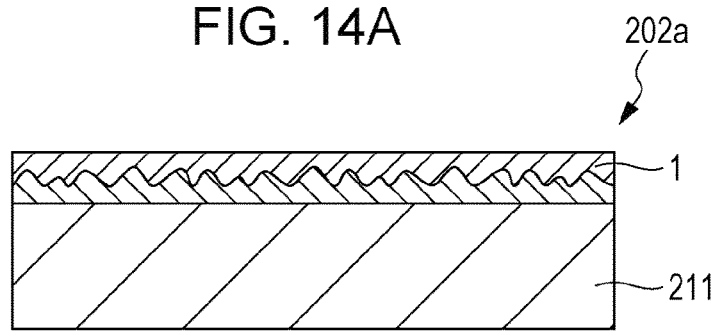
FIG. 14A is a sectional view illustrating a first example of structure of a slat.

FIG. 14A is a sectional view illustrating a first example of structure of the slat 202a. As illustrated in FIG. 14A, the slat 202a includes a base 211 and an optical film 1. The optical film 1 is preferably disposed on one of two principal surfaces of the base 211, the one principal surface being positioned on the side including an incident surface on which extraneous light is incident when the slat group 202 is in a closed state (e.g., on the side facing the window member). The optical film 1 and the base 211 are affixed to each other with an affixing layer, e.g., a bonding layer or an adhesive layer, interposed between them.

The base 211 can be formed in the shape of, e.g., a sheet, a film, or a plate. The base 211 can be made of, e.g., glass, resin, paper, or cloth. In consideration of the case of taking visible light into a predetermined indoor space, for example, a resin having transparency is preferably used as the material of the base 211. The glass, the resin, the paper, or the cloth used here may be the same as that generally used in ordinary rolling screens. The optical film 1 used here may be one type or a combination of two or more types of the optical films 1 according to the above-described first to fifth embodiments.

Figure 14B:
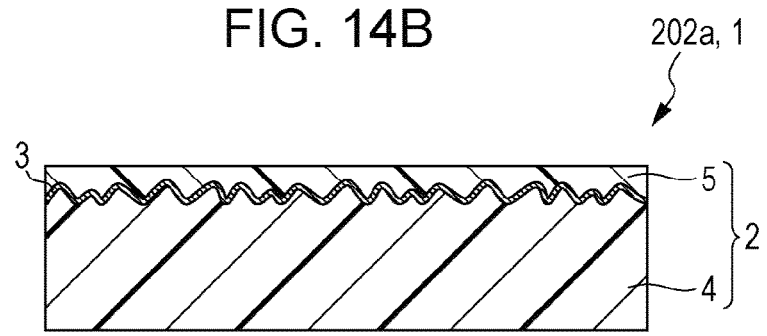
FIG. 14B is a sectional view illustrating a second example of structure of the slat.

FIG. 14B is a sectional view illustrating a second example of structure of the slat 202a. In the second example, as illustrated in FIG. 14B, the optical film 1 is used itself as the slat 202a. In this case, the optical film 1 preferably has such a level of rigidity that the optical film 1 can be supported by the ladder chords 206 and can maintain its shape in a supported state.

7. Seventh Embodiment

A seventh embodiment will be described below in connection with a rolling screen device, i.e., another example of the solar shading device capable of adjusting a degree at which a solar shading member cuts off the incident light, by winding or unwinding the solar shading member.

Figure 15A:
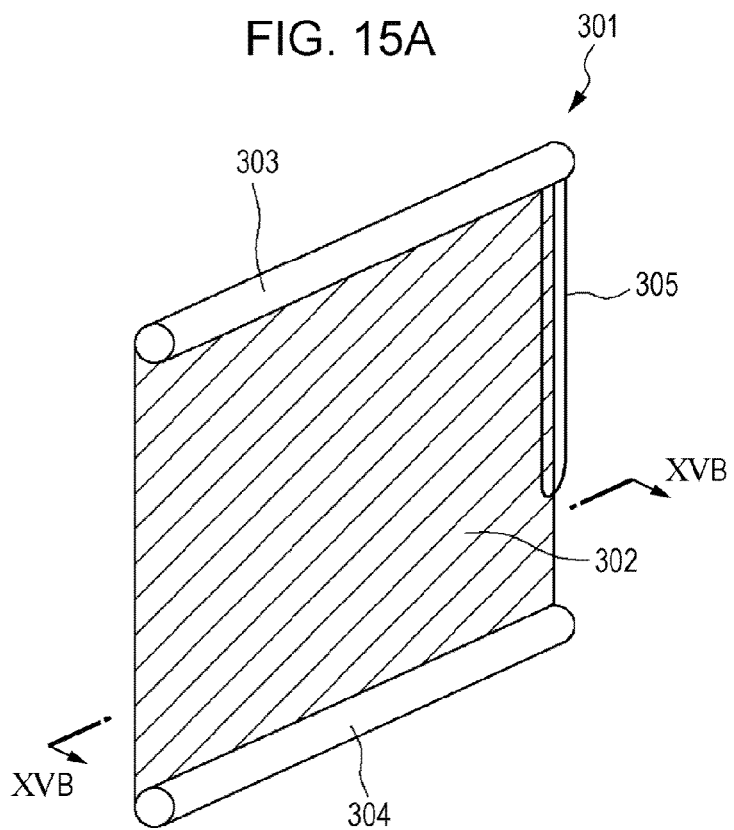
FIG. 15A is a perspective view illustrating one example of structure of a rolling screen device according to a seventh embodiment.

FIG. 15A is a perspective view illustrating one example of structure of a rolling screen device 301 according to the seventh embodiment. As illustrated in FIG. 15A, the rolling screen device 301 as another example of the solar shading device includes a screen 302, a head box 303, and a core member 304. The head box 303 can raise and fall the screen 302 with operation of an operating member, such as a chain 305. The head box 303 includes therein a winding shaft for taking up and letting out the screen 302, and one end of the screen 302 is coupled to the winding shaft. Further, the core member 304 is coupled to the other end of the screen 302. Preferably, the screen 302 has flexibility. The shape of the screen 302 is not limited to particular one and is preferably selected depending on the shape of, e.g., a window member to which the rolling screen device 301 is applied. For example, the screen 302 has a rectangular shape.

Figure 15B:
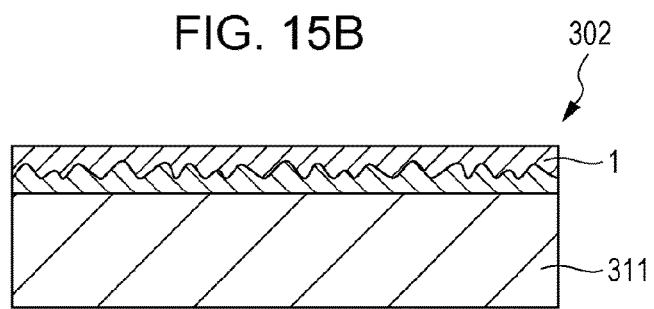
FIG. 15B is a sectional view, taken along line XVB-XVB in FIG. 15A, illustrating one example of structure of a screen.

FIG. 15B is a sectional view, taken along line XVB-XVB in FIG. 15A, illustrating one example of structure of the screen 302. As illustrated in FIG. 15B, the screen 302 includes a base 311 and an optical film 1. The screen 302 preferably has flexibility. The optical film 1 is preferably disposed on one of two principal surfaces of the base 311, the one principal surface being positioned on the side including an incident surface on which extraneous light is incident (e.g., on the side facing the window member). The optical film 1 and the base 311 are affixed to each other with an affixing layer, a bonding layer or an adhesive layer, interposed between them. Note that the structure of the screen 302 is not limited to the illustrated example and the optical film 1 may be used itself as the screen 302.

The base 311 can be formed in the shape of, e.g., a sheet, a film, or a plate. The base 311 can be made of, e.g., glass, resin, paper, or cloth. In consideration of the case of taking visible light into a predetermined indoor space, for example, a resin having transparency is preferably used as the material of the base 311. The glass, the resin, the paper, or the cloth used here may be the same as that generally used in ordinary rolling screens. The optical film 1 used here may be one type or a combination of two or more types of the optical films 1 according to the above-described first to fifth embodiments.

8. Eighth Embodiment

An eighth embodiment will be described in connection with the case of applying the present technology to a fitting (e.g., an interior or exterior member) that includes a lighting portion provided with an optical body having diffuse reflective power.

Figure 16A:
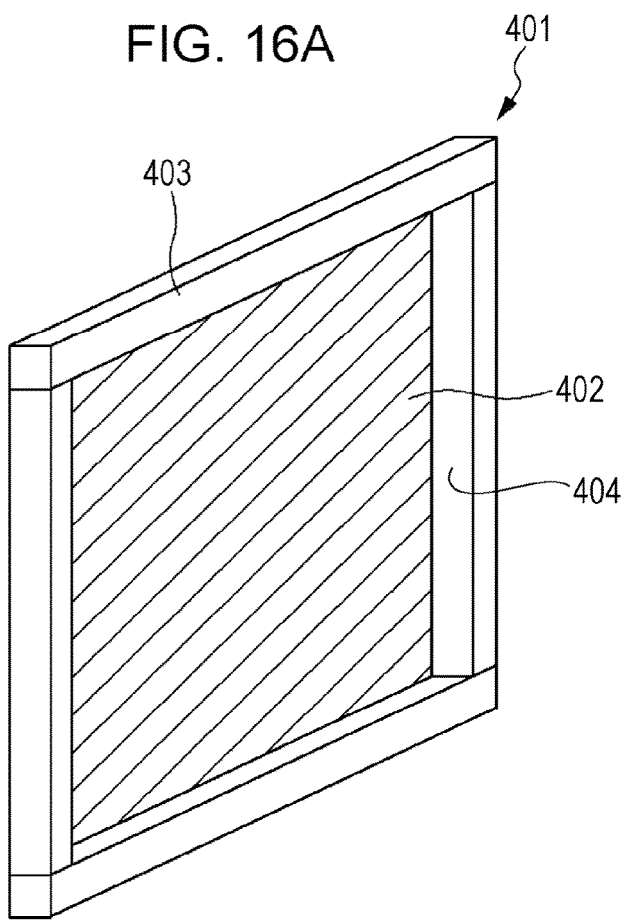
FIG. 16A is a perspective view illustrating one example of structure of a fitting according to an eighth embodiment.

FIG. 16A is a perspective view illustrating one example of structure of a fitting 401 according to the eighth embodiment. As illustrated in FIG. 16A, the fitting 401 includes a lighting portion 404 provided with an optical body 402. More specifically, the fitting 401 includes the optical body 402 and a frame member 403 that is disposed in a peripheral portion of the optical body 402. The optical body 402 is fixedly held by the frame member 403, but the optical body 402 can be removed, when necessary, by disassembling the frame member 403. While one example of the fitting 401 is a shoji (i.e., a paper-made and/or glass-fitted sliding door), applications of the present technology are not limited to such an example and embodiments of the present technology can be applied to various types of fittings that include lighting portions.

Figure 16B:
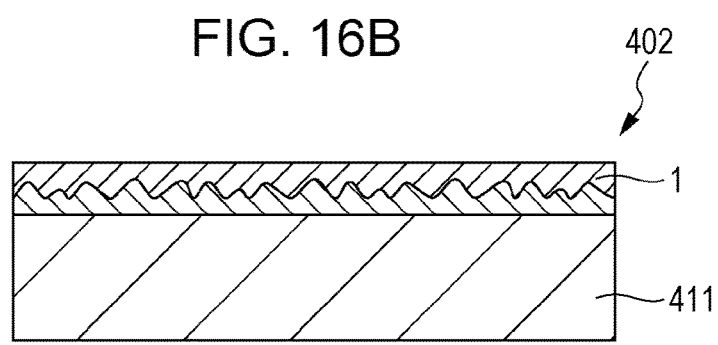
FIG. 16B is a sectional view illustrating one example of structure of an optical body.

FIG. 16B is a sectional view illustrating one example of structure of the optical body 402. As illustrated in FIG. 16B, the optical body 402 includes a base 411 and an optical film 1. The optical film 1 is disposed on one of two principal surfaces of the base 411, the one principal surface being positioned on the side including an incident surface on which extraneous light is incident (e.g., on the side facing the window member or outward). The optical film 1 and the base 411 are affixed to each other with an affixing layer, e.g., a bonding layer or an adhesive layer, interposed between them. Note that the structure of the shoji (specifically the optical body 402) is not limited to the illustrated example and the optical film 1 may be used itself as the optical body 402.

The base 411 is formed of, e.g., a sheet, a film, or a plate each having flexibility. The base 411 can be made of, e.g., glass, resin, paper, or cloth. In consideration of the case of taking visible light into a predetermined indoor space, for example, a resin having transparency is preferably used as the material of the base 411. The glass, the resin, the paper, or the cloth used here may be the same as that generally used in ordinary rolling screens. The optical film 1 used here may be one type or a combination of two or more types of the optical films 1 according to the above-described first to fifth embodiments.

EXAMPLES

While the present technology will be described in more detail below in connection with EXAMPLES, the present technology is not limited to the following EXAMPLES.

In the following EXAMPLES and COMPARATIVE EXAMPLES, the mean film thickness of the reflecting layer was measured as explained below.

First, an optical film was cut by using an FIB (Focused Ion Beam) to form a cross-section. Then, the film thickness of the reflecting layer was measured in a direction perpendicular to the incident surface or the emergent surface by using a TEM (Transmission Electron Microscope). The measurement was repeated at arbitrary 10 points on the optical film, and measured values were simply averaged (arithmetically averaged), thereby obtaining the mean film thickness.

Example 1

First, a transmissive anisotropic diffusion sheet (trade name: LSD40×20°, acryl sheet type) (FWHM angles of transmitted light resulting from incident light entering perpendicularly to a film are 40° and 20°, respectively, with respect to a first axis in a film plane and an axis perpendicular to the first axis), made by POC (Physical Optics Corporation) and fabricated using the laser interference method, was prepared as an underlying shaped film (shaped resin layer). On the underlying shaped film, an AgBi film was formed, as a reflecting layer, in a mean film thickness of 12 nm by sputtering using an alloy target with a composition ratio of Ag/Bi=99.0 at %/1.0 at %.

Next, a UV curable resin (composition) formulated to be matched in refractive index with the transmissive anisotropic diffusion sheet (trade name: LSD40×20°) was coated on the underlying film (specifically, on the reflecting layer) formed as described above, and a PET film (A4300 made by Toyobo Co., Ltd.) having a thickness of 75 μm was placed thereon. After purging out bubbles, the coated resin was cured by irradiating it with UV light. As a result, a resin layer (hereinafter referred to as an "embedding resin layer") was formed by the curing of the resin composition between the smooth PET film and the reflecting layer. Thus, an objective optical film was obtained.

Example 2

An optical film was obtained in a similar manner to that in EXAMPLE 1 except for using, as the underlying shaped film (shaped resin layer), a transmissive diffusion sheet (trade name: DDS40°) (acryl type) made by POC.

Example 3

A master for replicating an anisotropic light diffusion sheet was fabricated by oblique blasting under the following conditions:
(1) Blank used to fabricate the master: aluminum roll (diameter of 20 cm)
(2) Sand blasting conditions
sand blasting apparatus (made by Fuji Manufacturing Co., Ltd., Model Name: SGF-4(A))
abrasives: alumina (count: #180, mean grain size: 76 μm)
distance between blasting gun and master blank: 50 mm
angle formed between blasting gun and master blank: 8°
compressed air pressure: 0.5 MPa
state in spraying abrasives to surface of master blank: state illustrated in FIGS. 5A and 5B
scanning condition of blasting gun: the gun was scanned at pitch of 5 mm in X-direction in FIGS. 5A and 5B while the roll was rotated Next, urethane acrylate (ARONIX made by TOAGOSEI CO., LTD., refractive index of 1.533 after being cured) was coated on a PET film (A4300 made by Toyobo Co., Ltd.) having a thickness of 75 μm. The urethane acrylate was cured by irradiating it with UV light from the PET film side in a state that the PET film including the coated urethane acrylate was held in close contact with the master by the roll-to-toll process. A laminate of the PET film and a resin layer made of the cured urethane acrylate was peeled off from the master. As a result, a resin layer to which the shape reversed to that of the master was transferred (hereinafter referred to as a "shaped resin layer") was formed on the PET film. On the surface of the shaped resin layer, an AgBi film was formed as a reflecting layer in a mean film thickness of 12 nm by sputtering in a similar manner to that in EXAMPLE 1.

Next, a resin composition formulated as given below was coated on the reflecting layer, and a PET film (A4300 made by Toyobo Co., Ltd.) having a thickness of 75 μm was placed thereon. After passing a laminate through nip rolls and purging out bubbles, the coated resin was cured by irradiating it with UV light. As a result, an embedding resin layer was formed by the curing of the resin composition between the smooth PET film and the reflecting layer. Thus, an objective optical film was obtained.

Formulation of Resin Composition
Urethane acrylate 99 parts by weight
(ARONIX made by TOAGOSEI CO., LTD., refractive index of 1.533 after being cured)
2-acryloyloxyethyl acid phosphate 1 part by weight
(LIGHT-ACRYLATE P-1A made by KYOEISHA CHEMICAL Co., LTD.)

Example 4

An optical film was obtained in a similar manner to that in EXAMPLE 3 except for forming, as a partially reflecting layer, an AlTi film in a thickness of 10 nm.

Example 5

An optical film was obtained in a similar manner to that in EXAMPLE 4 except that a resin composition formulated as given below was used as a material of the embedding resin layer, and that the difference in refractive index between the embedding resin layer and the shaped resin layer was set to 0.003.

Formulation of Resin Composition
Urethane acrylate 99 parts by weight
(ARONIX made by TOAGOSEI CO., LTD., refractive index of 1.536 after being cured)
2-acryloyloxyethyl acid phosphate 1 part by weight
(LIGHT-ACRYLATE P-1A made by KYOEISHA CHEMICAL Co., LTD.)

Example 6

An optical film was obtained in a similar manner to that in EXAMPLE 4 except that a resin composition formulated as given below was used as a material of the embedding resin layer, and that the difference in refractive index between the embedding resin layer and the shaped resin layer was set to 0.006.

Formulation of Resin Composition
Urethane acrylate 99 parts by weight
(ARONIX made by TOAGOSEI CO., LTD., refractive index of 1.539 after being cured)
2-acryloyloxyethyl acid phosphate 1 part by weight
(LIGHT-ACRYLATE P-1A made by KYOEISHA CHEMICAL Co., LTD.)

Example 7

An optical film was obtained in a similar manner to that in EXAMPLE 4 except that a resin composition formulated as given below was used as a material of the embedding resin layer, and that the difference in refractive index between the embedding resin layer and the shaped resin layer was set to 0.009.

Formulation of Resin Composition
Urethane acrylate 99 parts by weight (ARONIX made by TOAGOSEI CO., LTD., refractive index of 1.542 after being cured)
2-acryloyloxyethyl acid phosphate 1 part by weight
(LIGHT-ACRYLATE P-1A made by KYOEISHA CHEMICAL Co., LTD.)

Example 8

An optical film was obtained in a similar manner to that in EXAMPLE 3 except that the partially reflecting layer (wavelength-selective reflecting layer) was formed by successively stacking films of GAZO (27 nm), AgNdCu (9 nm), and GAZO (88 nm) from the lower side.

Example 9

An optical film was obtained in a similar manner to that in EXAMPLE 3 except that the partially reflecting layer (wavelength-selective reflecting layer) was formed by successively stacking films of GAZO (mean film thickness of 27 nm), AgNdCu (mean film thickness of 9 nm), GAZO (mean film thickness of 88 nm), AgNdCu (mean film thickness of 9 nm), and GAZO (mean film thickness of 27 nm) from the lower side.

Comparative Example 1

An optical film was obtained by forming an AlTi film in a mean film thickness of 10 nm on a PET film (A4300 made by Toyobo Co., Ltd., thickness of 75 µm) having a smooth surface.

Comparative Example 2

An optical film was obtained in a similar manner to that in EXAMPLE 3 except that the partially reflecting layer (wavelength-selective reflecting layer) was formed as an AlTi film in a mean film thickness of 100 nm.

Comparative Example 3

An optical film was obtained in a similar manner to that in EXAMPLE 4 except that a resin composition formulated as given below was used as a material of the embedding resin layer, and that the difference in refractive index between the embedding resin layer and the shaped resin layer was set to 0.012.

Formulation of Resin Composition
Urethane acrylate 99 parts by weight
(ARONIX made by TOAGOSEI CO., LTD., refractive index of 1.545 after being cured)
2-acryloyloxyethyl acid phosphate 1 part by weight
(LIGHT-ACRYLATE P-1A made by KYOEISHA CHEMICAL Co., LTD.)

Evaluation of Spectral Transmittance and Chromaticity

For each of the optical films according to EXAMPLES 1-9 and COMPARATIVE EXAMPLES 1-3, spectral transmittance was evaluated as follows.

Figure 18A:
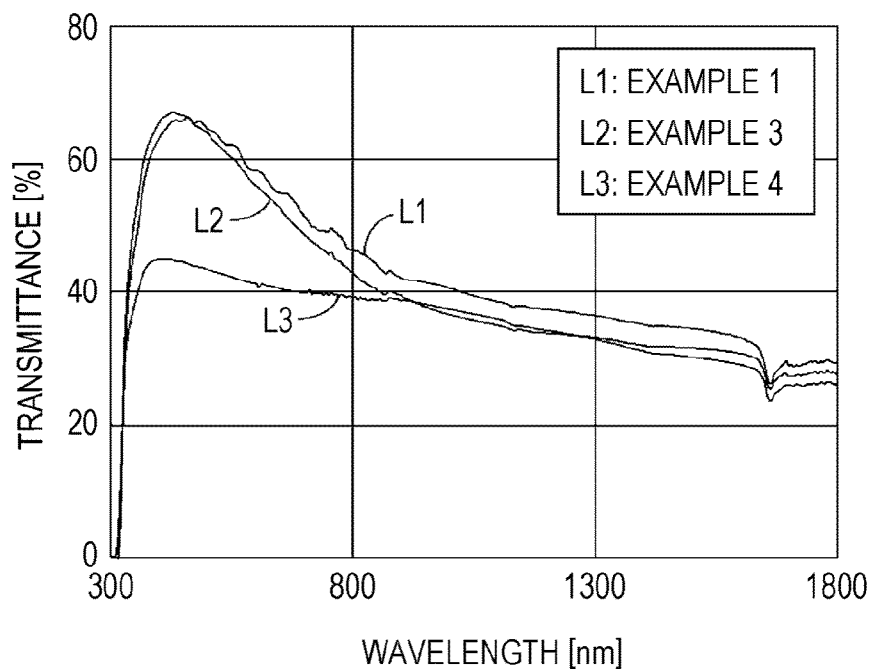
FIG. 18A is a graph illustrating spectral transmittance waveforms of optical films of EXAMPLES 1, 3 and 4.
Figure 19A:
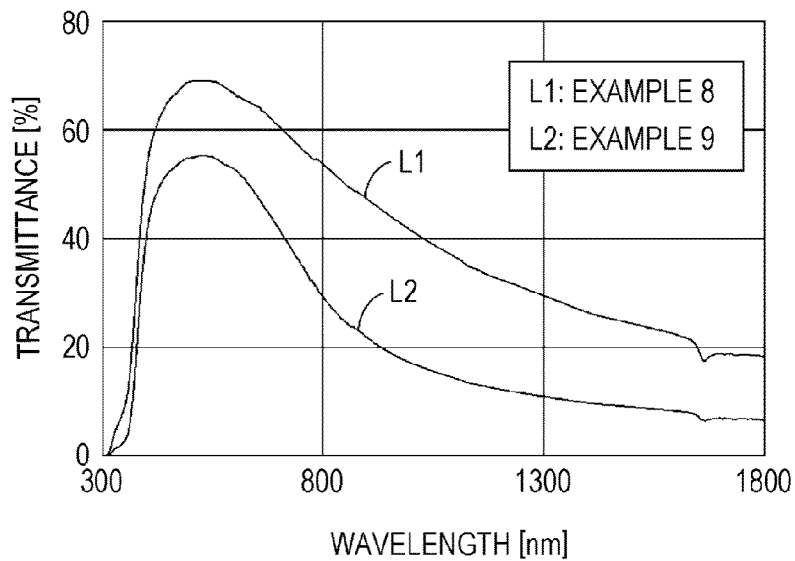
FIG. 19A is a graph illustrating spectral transmittance waveforms of optical films of EXAMPLES 8 and 9.
Figure 20A:
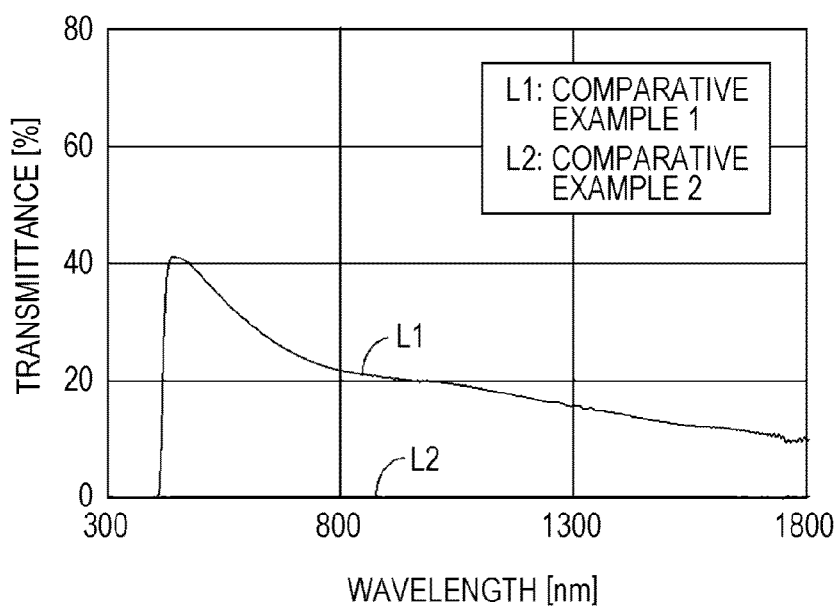
FIG. 20A is a graph illustrating spectral transmittance waveforms of optical films of COMPARATIVE EXAMPLES 1 and 2.

The spectral transmittance in the visible range and the infrared range was measured by using DUV3700 made by Shimadzu Corporation. An incident angle of light entering each sample was set to 0° (i.e., vertical incidence), and the measurement was performed on the linearly transmitted light. The measured spectral transmittance waveforms are plotted in FIGS. 18A, 19A and 20A.

Figure 18B:
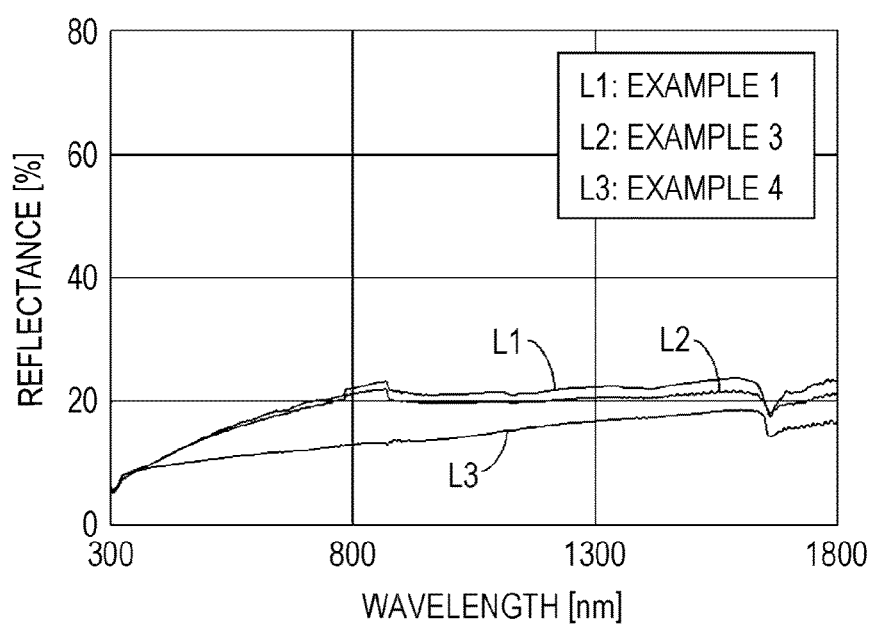
FIG. 18B is a graph illustrating spectral reflectance waveforms of the optical films of EXAMPLES 1, 3 and 4.
Figure 19B:
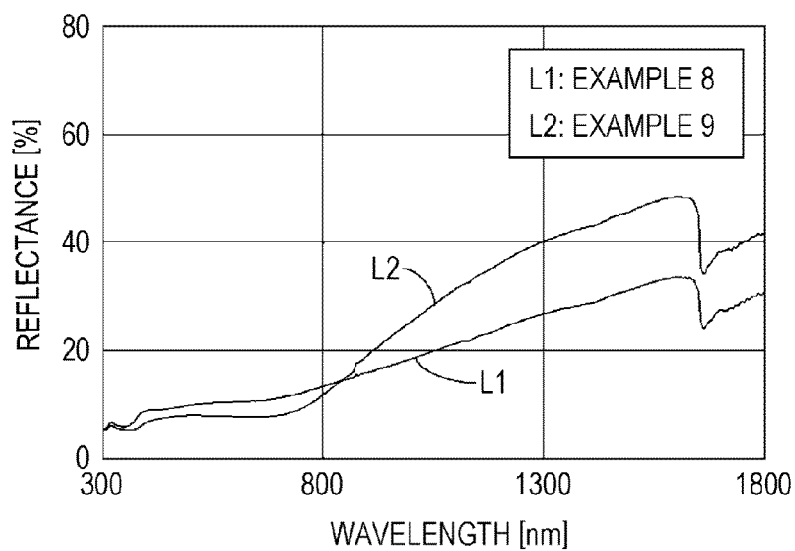
FIG. 19B is a graph illustrating spectral reflectance waveforms of the optical films of EXAMPLES 8 and 9.
Figure 20B:
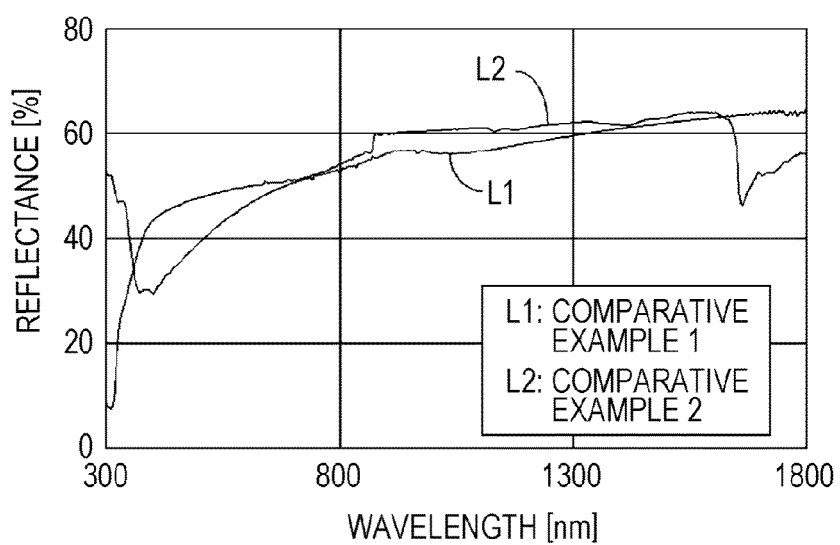
FIG. 20B is a graph illustrating spectral reflectance waveforms of the optical films of COMPARATIVE EXAMPLES 1 and 2.

Spectral reflectance of the optical film was measured by using the same apparatus (DUV3700) by setting an incident angle of light entering each sample to 8° and by receiving the reflected light with an integrating sphere. The measured spectral reflectance waveforms are plotted in FIGS. 18B, 19B and 20B.

Evaluation of Diffuse Reflection

Figure 21:
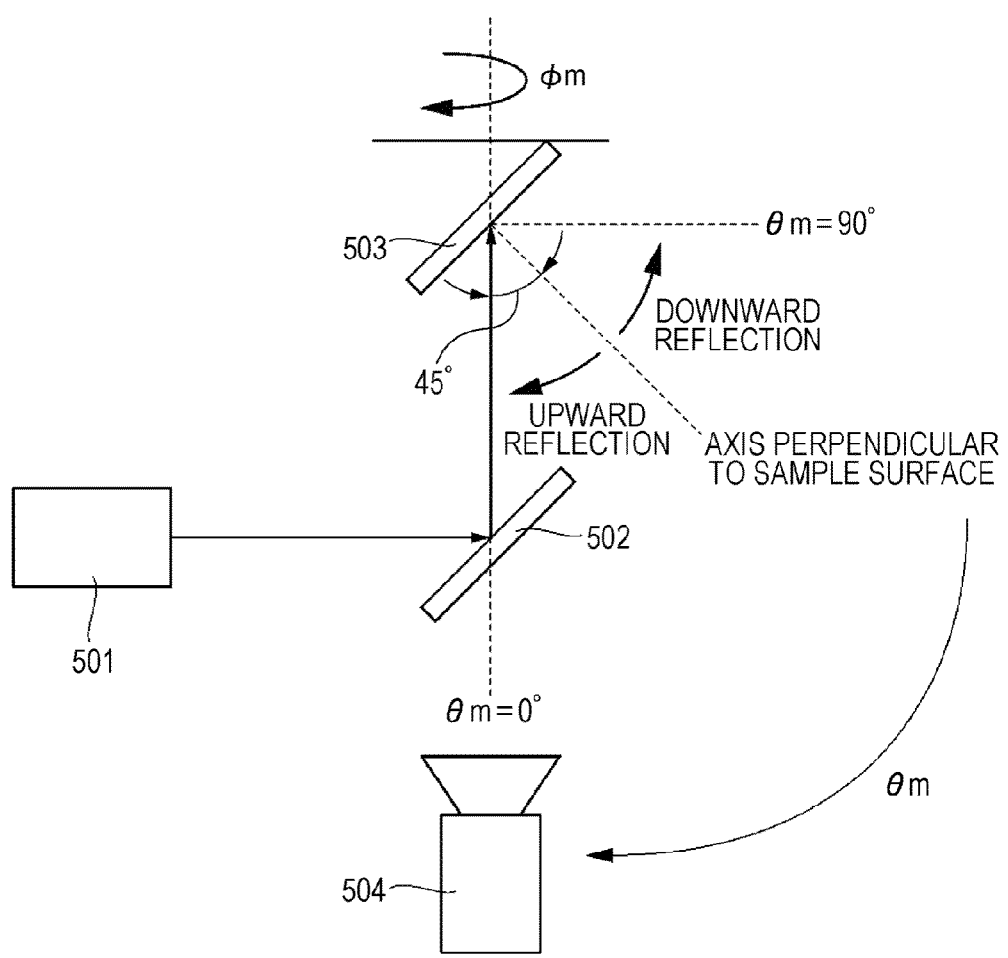
FIG. 21 is an illustration to explain devices used for measuring a distribution of reflection angle for each of the optical films of EXAMPLES 1 to 9 and COMPARATIVE EXAMPLES 1 to 3.
Figure 22:
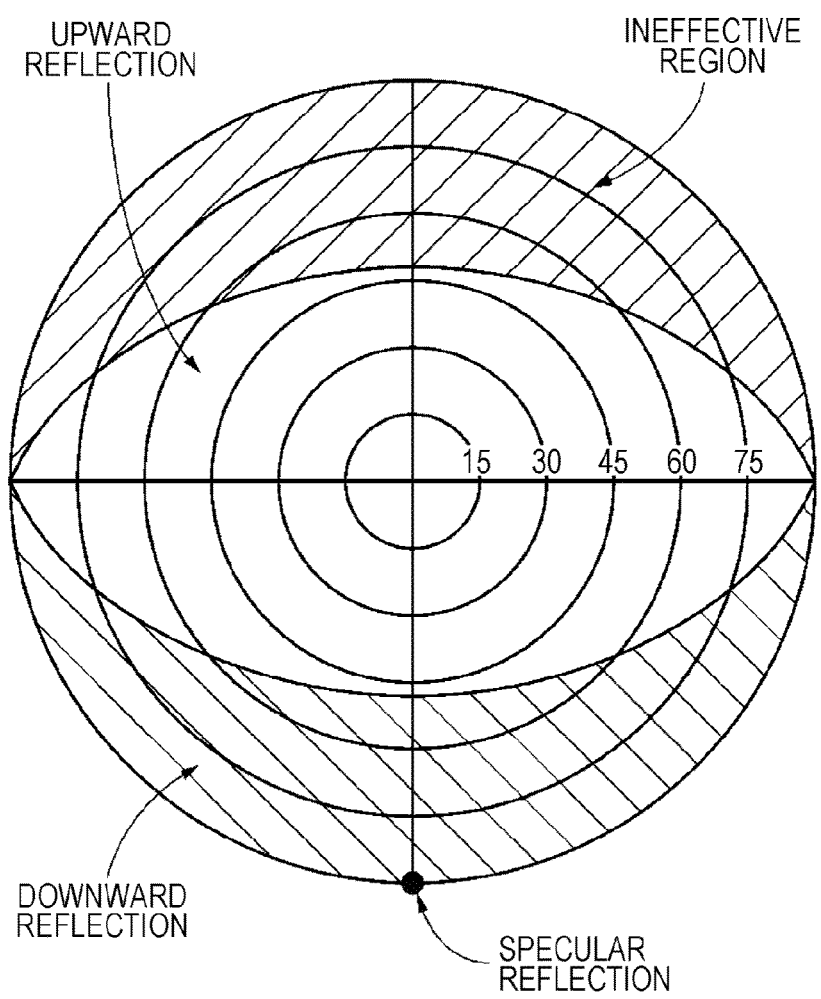
FIG. 22 is an illustration to explain polar coordinate plotting.
Figure 23:
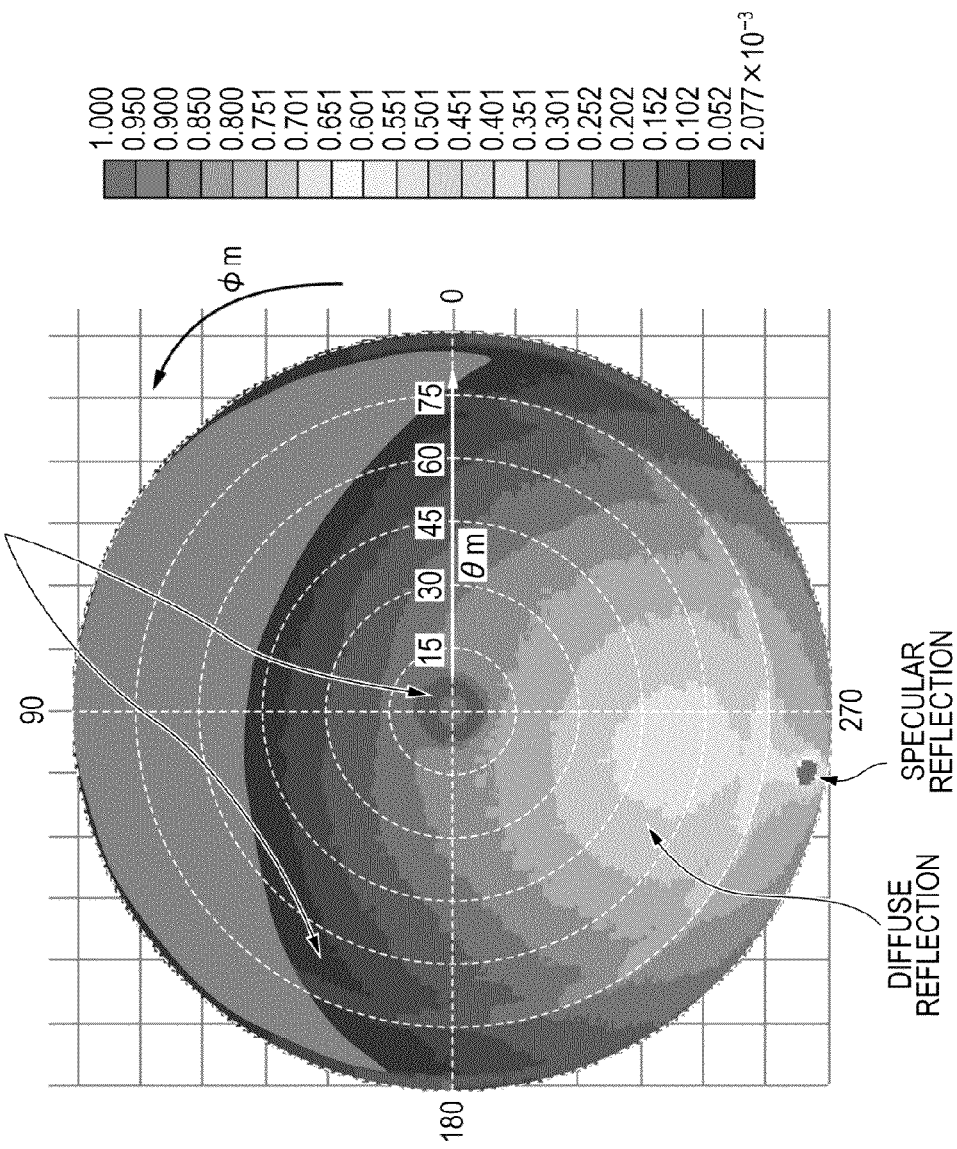
FIG. 23 illustrates a polar coordinate plot for the optical film of EXAMPLE 1.
Figure 24:
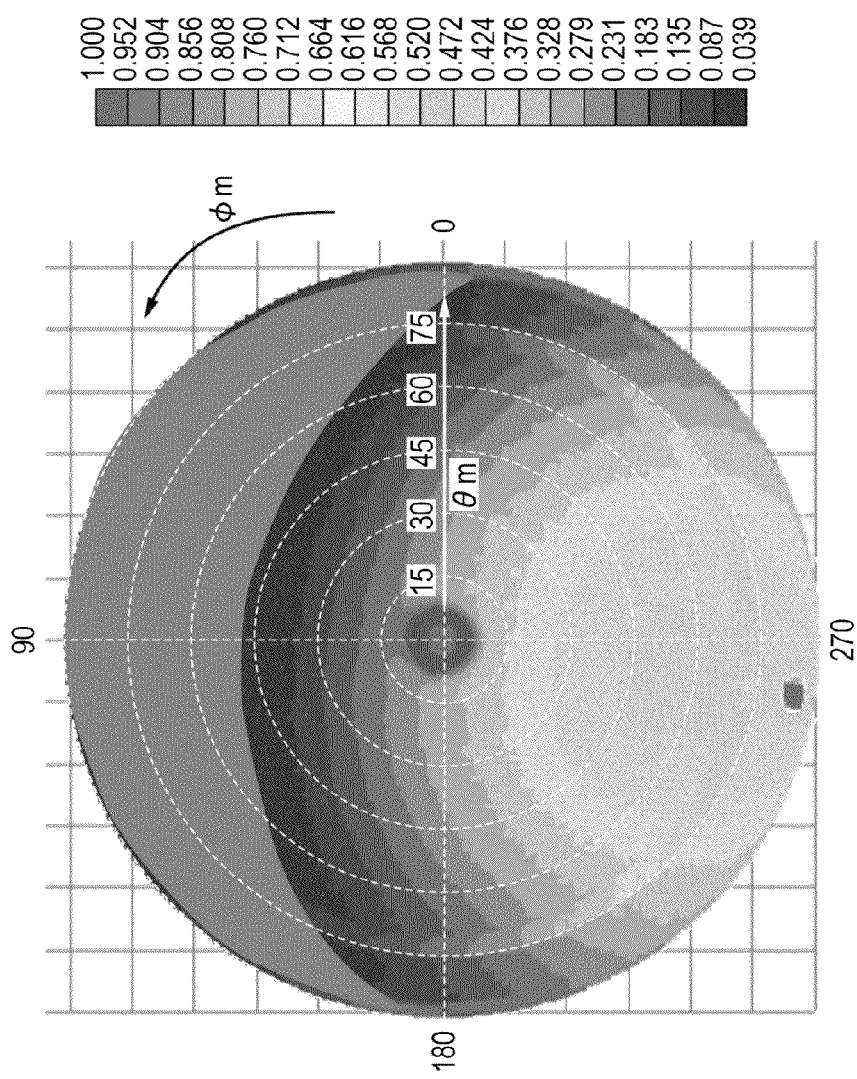
FIG. 24 illustrates a polar coordinate plot for the optical film of EXAMPLE 2.
Figure 25:
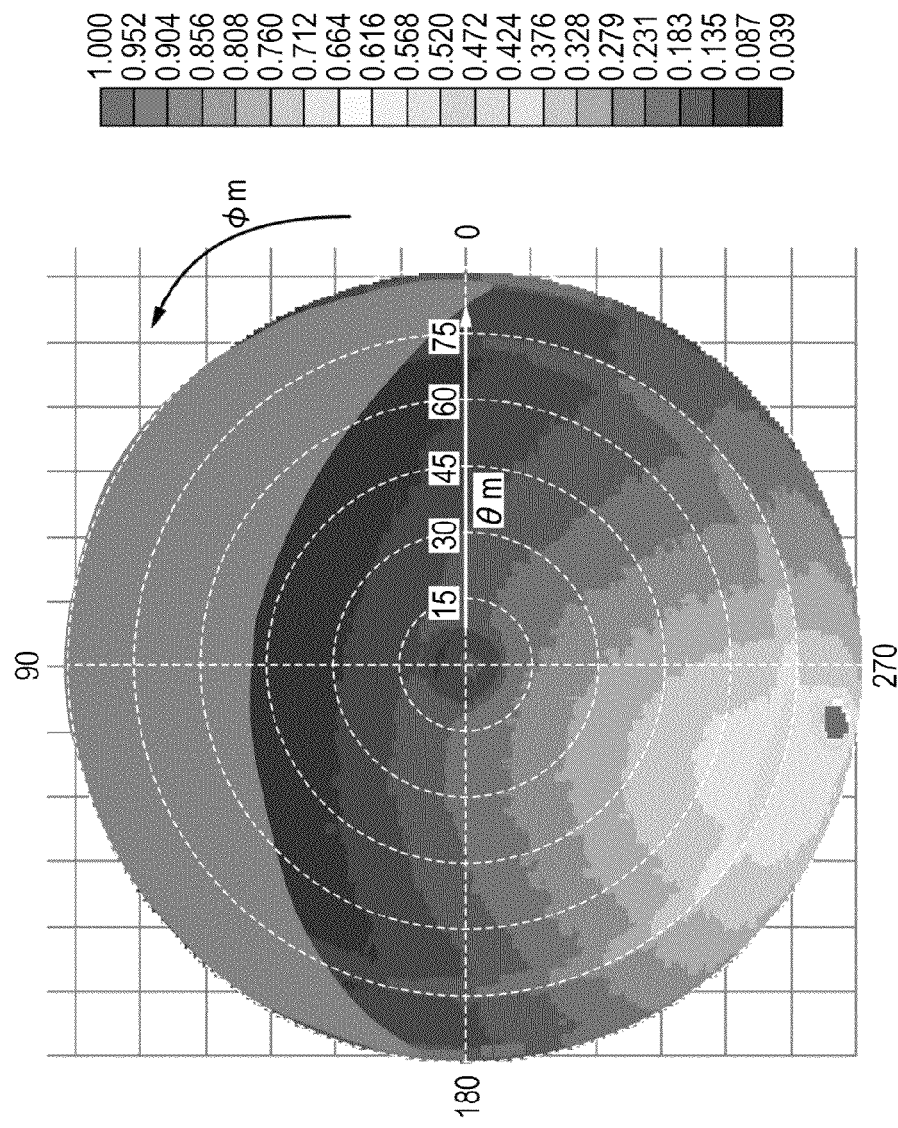
FIG. 25 illustrates a polar coordinate plot for the optical film of EXAMPLE 3.
Figure 26A:
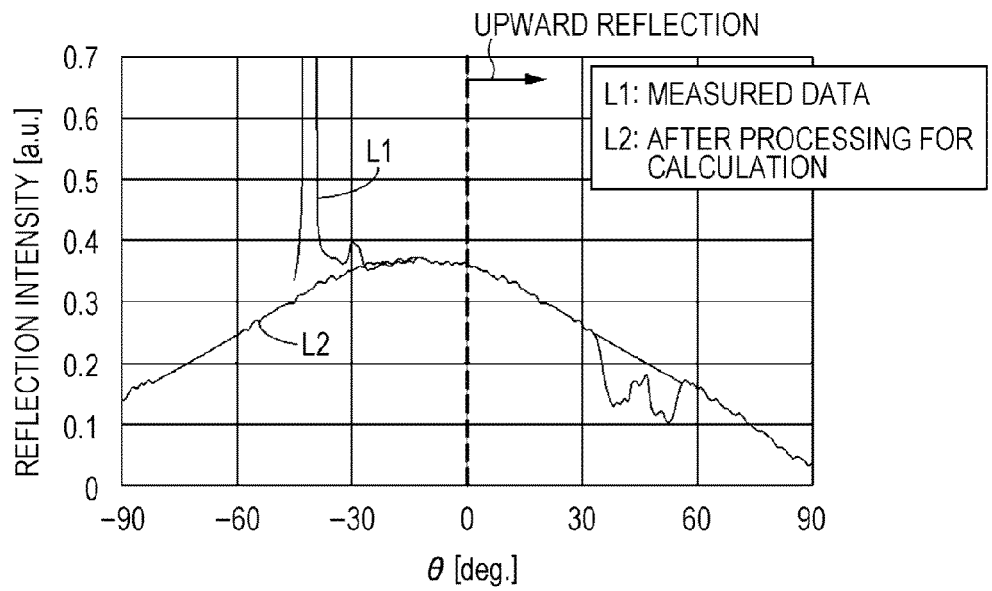
FIG. 26A is a graph illustrating the result of plotting reflection intensity in an azimuth including an axis of incident light and an axis of specularly reflected light in the optical film of EXAMPLE 1.
Figure 26B:
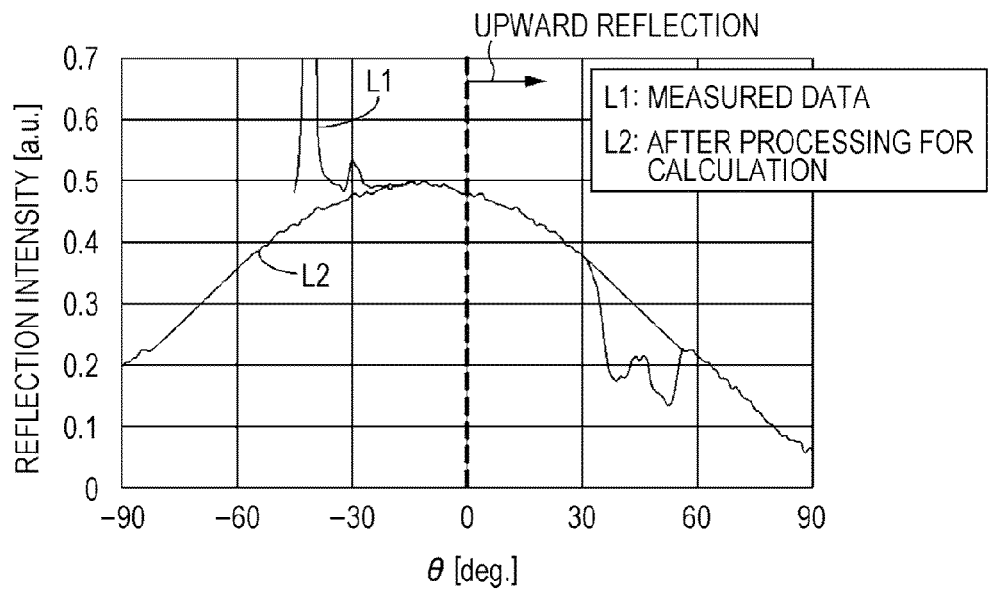
FIG. 26B is a graph illustrating the result of plotting reflection intensity in an azimuth including an axis of incident light and an axis of specularly reflected light in the optical film of EXAMPLE 2.
Figure 27:
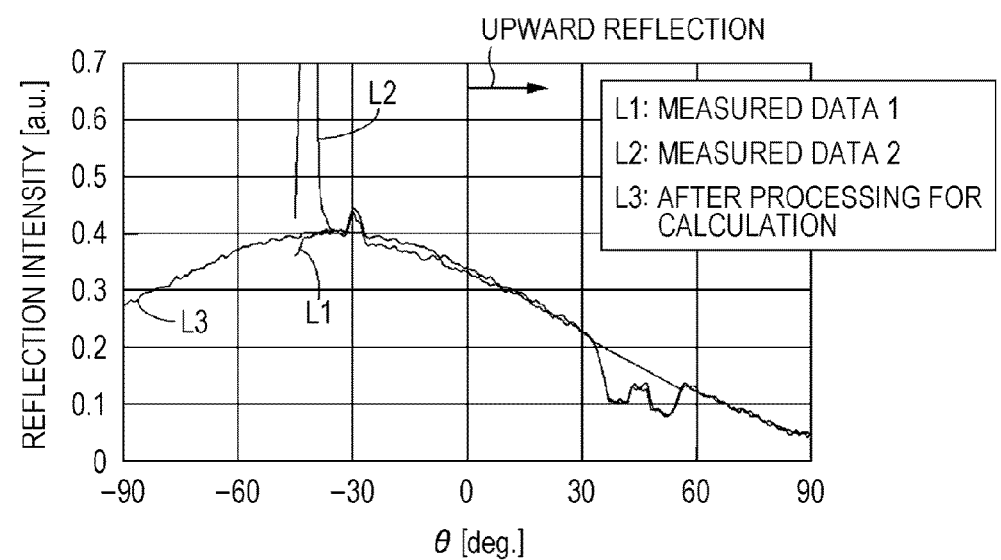
FIG. 27 is a graph illustrating the result of plotting reflection intensity in an azimuth including an axis of incident light and an axis of specularly reflected light in the optical film of EXAMPLE 3.

For each of the optical films according to EXAMPLES 1-9 and COMPARATIVE EXAMPLES 1-3, a distribution of reflection angle was evaluated as follows. Using a halogen light source 501 (FIG. 21) collimated with parallelism of 0.5° or less, a sample 503 was illuminated with incident light that was emitted from the halogen light source 501 and then reflected by a half mirror 502. Light reflected by the sample 503 was detected by a detector 504. A mean value of reflection intensity at wavelengths of 900 to 1550 nm was plotted on polar coordinates by scanning the detector 504 over the range of 0 to 90° ($\theta$m) while the sample 503 was arranged in a posture inclined 45° with respect to the incident light and was rotated through 360° ($\phi$m) about an axis perpendicular to the incident light (see FIGS. 21 and 22). The results measured for EXAMPLES 1 to 3 are illustrated, as an example of evaluation results, in FIGS. 23 to 25. Note that, for EXAMPLES 1 and 3 having anisotropy in diffuse reflection, the measurement was performed by arranging a direction in which the diffusely reflected light spreads to a wider angle to be $\phi$m≈90°. Further, the results of plotting the reflection intensity in azimuth containing the axis of the incident light and the axis of specularly reflected light are graphed in FIGS. 26A, 26B and 27 for EXAMPLES 1 to 3. In each of FIGS. 26A, 26B and 27, $\theta$=0° represents an axis perpendicular to the sample surface, and "minus" represents downward reflection. Upward reflection represents a component reflected upward relative to a horizontal plane when the sample 503 is arranged in a vertical plane. Although the upward reflectance can be calculated from the polar coordinate plot of FIG. 22, a calculation method is complicated. For that reason, the upward reflectance was calculated here in a simplified manner based on the graphs of FIGS. 26A, 26B and 27 each representing a distribution of reflection intensity in the incident plane. For the plots of FIGS. 26A, 26B and 27, the diffusely reflected light except for the specularly reflected light was compensated for a component corresponding to a decrease of the intensity caused by the half mirror 502 and a component corresponding to an increase of the intensity caused by stray light (see the plot of calculated data (L2) in each graph). On that occasion, because reflection in a direction lower than the specular reflection was not measured due to the specific layout of the measuring optical system, the plotting was made on an assumption that the distribution of the reflection intensity was vertically symmetrical with respect to an axis at which the reflection intensity was maximized. Further, the calculation results of upward reflectance are listed in Table 1, given below, by defining the upward reflection as the reflection toward the side corresponding to a smaller angle than that of the axis ($\theta$m=45°) perpendicular to the sample surface, and by defining the upward reflectance as (upward reflection/all reflection components except for specular reflection). From the calculation results, it is understood that the upward reflectance depends on the shape of the reflecting layer regardless of the type of the reflecting layer. Additionally, because the direction in which the diffuse reflection intensity is maximized is shifted in EXAMPLE 3 depending on the asymmetrical shape of the optical film, there is a difference of about 10° in $\phi$m between the direction of the maximized diffuse reflection intensity and the specular reflection direction. However, the calculation results of upward reflectance differ from each other just several percentages regardless of which one of those two directions is selected for the calculation.

Evaluation of Transmission Image Clarity

For each of the optical films according to EXAMPLES 1-9 and COMPARATIVE EXAMPLES 1-3, transmission image clarity was evaluated as follows. Values of the transmission image clarity were measured in conformity with JIS K7105 using optical combs with comb widths of 2.0 mm, 1.0 mm, 0.5 mm and 0.125 mm. A measuring apparatus used for the evaluation was an image-clarity measuring device (ICM-1T) made by Suga Test Instruments Co., Ltd. A total of the values of the transmission image clarity measured using optical combs with comb widths of 2.0 mm, 1.0 mm, 0.5 mm and 0.125 mm was calculated. The obtained results are listed in Table 1. A light source used here was the D65 light source.

Evaluation of Haze

For each of the optical films according to EXAMPLES 1-9 and COMPARATIVE EXAMPLES 1-3, haze was evaluated as follows.

Haze was measured under measuring conditions in conformity with JIS K7136 by using a haze meter HM-150 (made by Murakami Color Research Laboratory Co., Ltd.). The measured results are listed in Table 1. A light source used here was the D65 light source.

Evaluation of Visibility

For each of the optical films according to EXAMPLES 1-9 and COMPARATIVE EXAMPLES 1-3, visibility was evaluated as follows.

The fabricated film was affixed to a glass with a thickness of 3 mm by using an optically transparent adhesive. The glass was held at a distance away from the eyes about 50 cm, and the visibility was evaluated based on the following criteria by observing the inside of an adjacent building at a distance of about 10 m through the glass. The evaluation results are listed in Table 1.

o: neither multiple images nor clouding due to diffraction appear, and the outer sight can be viewed in a similar way to that when viewed through an ordinary window Δ: no problems occur in ordinary use, but if there is a reflector having a mirror-like surface, the perimeter of the reflector is slightly blurred x: what is present on the opposite (outer) side is undistinguishable due to clouding xx: there is no sight on the opposite (outer) side Evaluation of Diffraction Pattern For each of the optical films according to EXAMPLES 1-9 and COMPARATIVE EXAMPLES 1-3, a diffraction pattern was evaluated as follows.

Figure 17A:
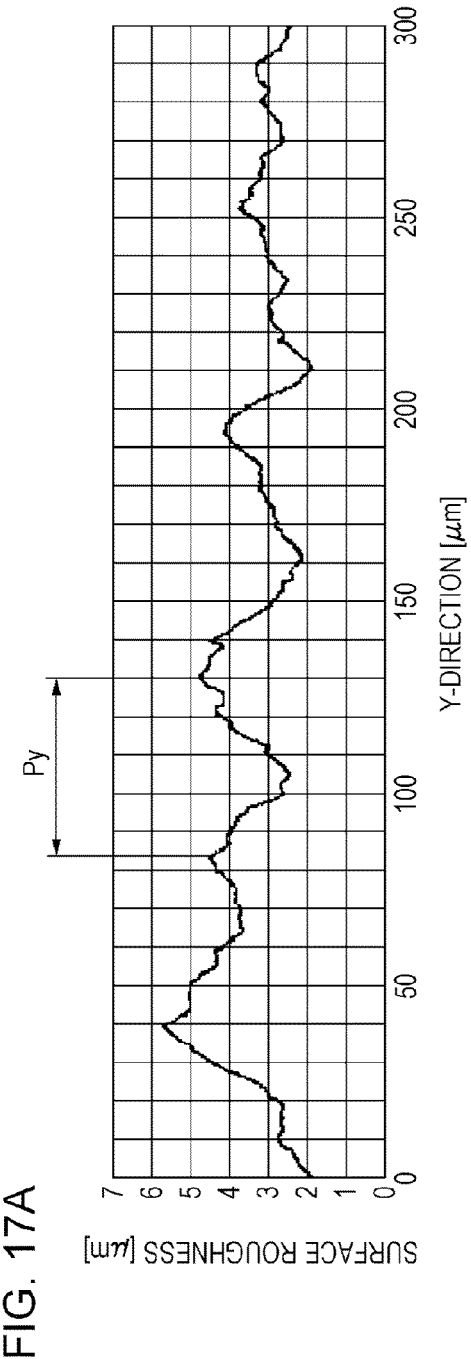
FIGS. 17A and 17B are each a sectional profile illustrating the result of measuring surface roughness of a replica master.
Figure 17B:
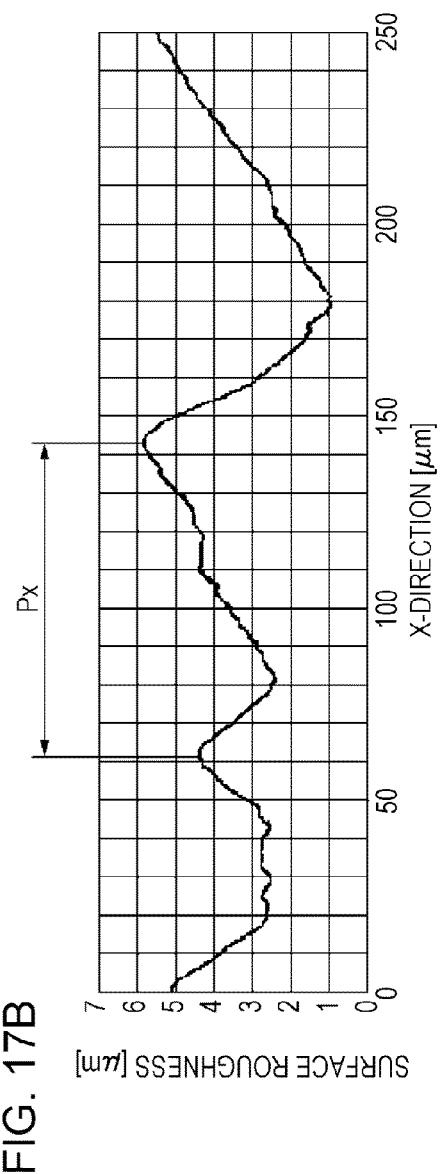

The fabricated film was affixed to a glass with a thickness of 3 mm by using an optically transparent adhesive. The glass was held at a distance away from the eyes about 50 cm, and the diffraction pattern was evaluated based on the following criteria by observing a lamp at a distance of about 500 m through the glass. The evaluation results are listed in Table 1.

o: the lamp can be viewed with no annoyances in a similar way to that when the film is not affixed Δ: a faintly spreading zone appears around the lamp, but substantially no annoyances are felt x: a spot-like strong pattern appears around the lamp Evaluation of Surface Roughness Surface roughness of the optical film (EXAMPLE 3) to which the random concave-convex shape had been transferred by using the replica master fabricated with oblique blasting was evaluated as follows. The evaluation results are plotted in FIGS. 17A and 17B.

Arithmetic mean roughness Ra was obtained by measuring the surface roughness of the optical film with a probe-type surface shape measuring machine ET-4000 (made by Kosaka Laboratory Ltd.), and deriving a roughness curve from a two-dimensional profile curve. Measurement conditions were set in conformity with JIS B0601:2001. Details of the measurement conditions are as follows;

λc=0.8 mm, evaluation length: 4 mm, cutoff: ×5, and data sampling interval: 0.5 μm.

From the evaluation results, the following points were found.

A surface roughness pitch Px in the X-axis direction was longer than a surface roughness pitch Py in the Y-axis direction. Also, a mean concave-convex interval Sm was 0.14 in the X-axis direction and 0.08 in the Y-axis direction.

Evaluation of Number of Days Taken for Processing to Fabricate Master

For each of the replica masters used to fabricate the optical films according to EXAMPLES 1-9, the number of days taken for processing to fabricate the master was evaluated based on the following criteria. For the purpose of comparison, the number of days taken for processing to fabricate a replica master having a corner cube shape was also evaluated based on the same criteria.

o: within 2 days (a risk that a trouble may occur due to the occurrence of an earthquake, etc. during the processing is low. Even if a trouble occurs during the processing, the master can be easily fabricated soon by performing the processing again, and the production of the optical films is not affected. Hence, especial risk management is not necessary.)

Δ: 3 to 10 days (there is a risk that a trouble may occur due to the occurrence of an earthquake, etc. during the processing. If a trouble occurs during the processing, the master can be fabricated by performing the processing again, but the production of the optical films is possibly affected. It is hence preferable that risk management is taken into consideration.)

x: 11 days to 1 month (a risk that a trouble may occur due to the occurrence of an earthquake, etc. during the processing is high. If a trouble occurs during the processing, it is difficult to fabricate the master by performing the processing again, and the production of the optical films is severely affected. Hence, risk management is necessary.)

TABLE 1

| | Shape | Partially reflecting layer | Difference Δn in refractive index between shaped material and embedding material | Transmittance of all rays [%] | Upward reflectance [%] | Transmission image clarity (0.5 mm) | Haze [%] | Visibility | Diffraction pattern |
|---|---|---|---|---|---|---|---|---|---|
| EXAMPLE 1 | LSD40 × 20° | AgBi (12 nm) | Δn < 0.001 | 61 | 42 | 91 | 4.40 | o | o |
| EXAMPLE 2 | DDS40° | AgBi (12 nm) | Δn < 0.001 | 62 | 43 | 92 | 4.50 | o | o |
| EXAMPLE 3 | Oblique blasting | AgBi (12 nm) | Δn < 0.001 | 59 | 33 | 91 | 4.40 | o | o |
| EXAMPLE 4 | Oblique blasting | AlTi (10 nm) | Δn < 0.001 | 42 | 33 | 90 | 3.80 | o | o |
| EXAMPLE 5 | Oblique blasting | AlTi (10 nm) | 0.003 | 43 | 33 | 82 | 3.80 | o | o |
| EXAMPLE 6 | Oblique blasting | AlTi (10 nm) | 0.006 | 42 | 33 | 65 | 3.90 | Δ | Δ |
| EXAMPLE 7 | Oblique blasting | AlTi (10 nm) | 0.009 | 42 | 33 | 51 | 3.80 | Δ | Δ |
| EXAMPLE 8 | Oblique blasting | 3 layers stacked (*1) | Δn < 0.001 | 66 | 33 | 93 | 2.80 | o | o |
| EXAMPLE 9 | Oblique blasting | 5 layers stacked (*2) | Δn < 0.001 | 54 | 33 | 92 | 2.90 | o | o |

TABLE 1-continued

| | Shape | Partially reflecting layer | Difference Δn in refractive index between shaped material and embedding material | Transmittance of all rays [%] | Upward reflectance [%] | Transmission image clarity (0.5 mm) | Haze [%] | Visibility | Diffraction pattern |
|---|---|---|---|---|---|---|---|---|---|
| COMPARATIVE EXAMPLE 1 | Amorphous | AlTi (10 nm) | — | 33 | 0 | 80 | 0.60 | ○ | ○ |
| COMPARATIVE EXAMPLE 2 | Oblique blasting | AlTi (100 nm) | Δn < 0.001 | 0 | — | — | — | XX | — |
| COMPARATIVE EXAMPLE 3 | Oblique blasting | AlTi (10 nm) | 0.012 | 41 | — | 21 | 4.20 | X | X |

TABLE 2

| Master processing method | EXAMPLES, etc. | Number of days taken for processing to fabricate master |
|---|---|---|
| Blasting | EXAMPLES 3-9 | ○ |
| Laser interference | EXAMPLE 1 and 2 | ○ |
| Cutting into corner cube shape | — | x |

From the above evaluation results, the following points are found.

In EXAMPLES 1 to 9, since the semi-transmissive layer or the wavelength-selective reflecting layer, which are each the partially reflecting layer, is formed on the shaped resin layer having the random concave-convex shape, the occurrence of the diffraction pattern can be suppressed. Also, since the difference Δn in refractive index between the shaped resin layer and the embedding resin layer is set to be not larger than 0.010, the value of the transmission image clarity can be held not smaller than 50. Accordingly, the transmission image through the optical film can be formed as a clear image.

In COMPARATIVE EXAMPLE 1, because the partially reflecting layer is formed on the flat surface of the optical film, the upward reflectance is 0%.

In COMPARATIVE EXAMPLE 2, because the partially reflecting layer is formed in a large thickness of 100 nm, the optical film does not transmit light therethrough.

In COMPARATIVE EXAMPLE 3, because the difference Δn in refractive index between the shaped resin layer and the embedding resin layer exceeds 0.010, the value of the transmission image clarity is smaller than 50. Accordingly, the transmission image through the optical film tends to be blurred in appearance.

While the embodiments of the present technology have been described in detail, the present technology is not limited to the above-described embodiments and can be variously modified on the basis of the technical concept of the present technology.

For example, the structures, the methods, the shapes, the materials, the numerical values, etc. explained in the foregoing embodiments are merely mentioned for illustrative purpose, and different structures, methods, shapes, materials, numerical values, etc. can also be used when necessary.

Also, the structures in the above-described embodiments can be selectively combined with each other without departing from the scope of the present technology.

While the foregoing embodiments have been described, by way of example, in connection with the case where the window blind and the rolling screen device are manually operated, the window blind and the rolling screen device may be electrically operated.

The foregoing embodiments have been described, by way of example, in connection with the case where the optical film is affixed to the adherend, such as the window member. However, the adherend, such as the window member, may be constituted as the first optical layer or the second optical layer itself of the optical film. That modification enables the adherend, such as the window member, to have the diffuse reflection function in advance.

While the foregoing embodiments have been described, by way of example, in connection with the case where the optical body is the optical film, the shape of the optical body is not limited to a film, and the optical body may have a plate- or block-like shape.

While the foregoing embodiments have been described, by way of example, in connection with the case of applying the present technology to the interior or exterior members, such as the window member, the fitting, the slat of the window blind, and the screen of the rolling screen device, application examples of the present technology are not limited to the illustrated ones, and embodiments of the present technology are further applicable to other interior and exterior members than the above-described ones.

Examples of the interior or exterior members to which the optical body according to the embodiment of the present technology can be applied include an interior or exterior member formed by the optical body itself, and an interior or exterior member formed by a transparent base to which the optical body (diffuse reflector) is affixed. By installing such an interior or exterior member indoors or outdoors near a window, it is possible, for example, to diffusely reflect only an infrared ray to the outdoor and to take visible light into the indoor. Accordingly, when the interior or exterior member is installed, necessity of lighting for an indoor space is reduced. Further, since the interior or exterior member hardly causes scatter reflection toward the indoor side, a temperature rise in the surroundings can be suppressed. In addition, the optical body may be applied to other affixing target members (adherends) than the transparent base depending on the desired purpose of, for example, controlling visibility and/or increasing strength.

While the foregoing embodiments have been described, by way of example, in connection with the case of applying the present technology to the window blind and the rolling screen device, application examples of the present technology are not limited to the illustrated ones, and embodiments of the present technology are further applicable to various solar shading devices installed on the indoor or outdoor side.

While the foregoing embodiments have been described, by way of example, in connection with the case of applying the present technology to the solar shading device (e.g., the rolling screen device) where a degree at which the solar shading member cuts off the incident light can be adjusted by taking up or letting out the solar shading member, application examples of the present technology are not limited to the illustrated one. For example, embodiments of the present technology are further applicable to a solar shading device where a degree at which a solar shading member cuts off the incident light can be adjusted by folding or unfolding the solar shading member. One example of such a solar shading device is a pleated screen device where a degree at which a solar shading member cuts off the incident light can be adjusted by folding or unfolding a screen as the solar shading member in the form of bellows.

While the foregoing embodiments have been described, by way of example, in connection with the case of applying the present technology to a horizontal-type window blind (Venetian window blind), embodiments of the present technology are further applicable to a vertical-type window blind.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. An optical body with diffusion reflectivity comprising:
   a first optical layer having a random concave-convex surface;
   a reflecting layer formed on the concave-convex surface; and
   a second optical layer formed on the reflecting layer so as to fill the concave-convex surface;
   wherein the reflecting layer is a wavelength-selective reflecting layer for diffusely reflecting, of incident light, light in a specific wavelength band and transmitting light other than the specific wavelength band therethrough, and
   wherein a value of transmission image clarity for the light at wavelengths transmitting through the optical body is not smaller than 50 when measured in conformity with JIS K-7105 using an optical comb with a comb width of 0.5 mm.

2. The optical body with diffusion reflectivity according to claim 1, wherein a total value of transmission image clarity for the light at wavelengths transmitting through the optical body is not smaller than 230 when measured in conformity with JIS K-7105 using optical combs with comb widths of 0.125 mm, 0.5 mm, 1.0 mm and 2.0 mm.

3. The optical body with diffusion reflectivity according to claim 1, wherein a difference in refractive index between the first optical layer and the second optical layer is not more than 0.010.

4. The optical body with diffusion reflectivity according to claim 1, wherein the first optical layer and the second optical layer are made of a same resin having transparency in a visible range, and the second optical layer contains one or more additives.

5. The optical body with diffusion reflectivity according to claim 1, wherein at least one of the first optical layer and the second optical layer absorbs light in a specific wavelength band within a visible range.

6. The optical body with diffusion reflectivity according to claim 1, wherein an optical layer is formed by the first optical layer and the second optical layer, and
   the optical body further comprises a light scatterer in at least one of positions on a surface of the optical layer, inside the optical layer, and between the wavelength-selective reflecting layer and the optical layer.

7. The optical body with diffusion reflectivity according to claim 1, further comprising a water-repellent or hydrophilic layer on an incident surface of the optical body.

8. The optical body with diffusion reflectivity according to claim 1, wherein the optical body diffusely reflects the light in the specific wavelength band to prevent the light in the specific wavelength band from entering a predetermined space, while transmitting the light other than the specific wavelength band therethrough to be taken into the predetermined space.

9. The optical body with diffusion reflectivity according to claim 1, wherein the wavelength-selective reflecting layer is made of a transparent electroconductive film containing, as a main component, an electroconductive material having transparency in a visible range, or a functional film containing, as a main component, a chromic material that reversibly changes reflective performance thereof upon application of an external stimulus.

10. A window member including the optical body with diffusion reflectivity according to claim 1.

11. A fitting including a lighting portion provided with the optical body with diffusion reflectivity according to claim 1.

12. A solar shading device comprising one or plural solar shading members to cut off sunlight,
   wherein the solar shading member includes the optical body with diffusion reflectivity according to claim 1.

13. An optical body with diffusion reflectivity comprising:
   a first optical layer having a random concave-convex surface;
   a reflecting layer formed on the concave-convex surface; and
   a second optical layer formed on the reflecting layer so as to fill the concave-convex surface;
   wherein the reflecting layer is a semi-transmissive layer for diffusely reflecting part of incident light and transmitting the remaining light therethrough, and
   wherein a value of transmission image clarity for the light at wavelengths transmitting through the optical body is not smaller than 50 when measured in conformity with JIS K-7105 using an optical comb with a comb width of 0.5 mm.

14. The optical body with diffusion reflectivity according to claim 2, wherein the semi-transmissive layer has transmittance of 5% or more and 70% or less in a wavelength range of 500 nm or longer to 1000 nm or shorter.

15. A method for manufacturing an optical body with diffusion reflectivity, comprising:
   forming a first optical layer having a random concave-convex surface;
   forming a reflecting layer on the concave-convex surface; and
   forming a second optical layer on the reflecting layer so as to fill the concave-convex surface;
   wherein the reflecting layer is a wavelength-selective reflecting layer for diffusely reflecting light in a specific wavelength band and transmitting light other than the specific wavelength band therethrough, and
   wherein a value of transmission image clarity for the light at wavelengths transmitting through the optical body is not smaller than 50 when measured in conformity with JIS K-7105 using an optical comb with a comb width of 0.5 mm.

16. The method for manufacturing an optical body with diffusion reflectivity according to claim 15, further comprising the step of forming a random concave-convex surface in a master surface,
   wherein, in forming the first optical layer, the random concave-convex surface in the master surface is transferred to a material of the first optical layer, thereby forming the first optical layer having the random concave-convex surface.

17. The method for manufacturing an optical body with diffusion reflectivity according to claim 16, wherein, in forming the random concave-convex shape in the master surface, the random concave-convex surface is formed in the master surface by a sand blasting method, a laser interference method, or a method utilizing photolithography and etching.

18. A method for manufacturing an optical body with diffusion reflectivity, comprising:
- forming a first optical layer having a random concave-convex surface;
- forming a reflecting layer on the concave-convex surface; and
- forming a second optical layer on the reflecting layer to embed so as to fill the concave-convex surface;
- wherein the reflecting layer is a semi-transmissive layer for diffusely reflecting part of incident light and transmitting the remaining light therethrough, and
- wherein a value of transmission image clarity for the light at wavelengths transmitting through the optical body is not smaller than 50 when measured in conformity with JIS K-7105 using an optical comb with a comb width of 0.5 mm.

* * * * *